United States Patent
Hatoh et al.

(10) Patent No.: US 6,884,536 B1
(45) Date of Patent: Apr. 26, 2005

(54) POLYMER ELECTROLYTE FUEL CELL

(75) Inventors: Kazuhito Hatoh, Osaka (JP); Junji Niikura, Hirakata (JP); Hideo Ohara, Katano (JP); Teruhisa Kanbara, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 390 days.

(21) Appl. No.: 10/129,314

(22) PCT Filed: Nov. 8, 2000

(86) PCT No.: PCT/JP00/07866

§ 371 (c)(1),
(2), (4) Date: May 3, 2002

(87) PCT Pub. No.: WO01/35477

PCT Pub. Date: May 17, 2001

(30) Foreign Application Priority Data

Nov. 8, 1999 (JP) .......................... 11/316721

(51) Int. Cl.[7] ............................... H01M 8/04
(52) U.S. Cl. .......................... 429/34; 429/39
(58) Field of Search ..................... 429/34–39

(56) References Cited

U.S. PATENT DOCUMENTS

| | | | |
|---|---|---|---|
| 4,175,165 A | 11/1979 | Adlhart | |
| 6,096,450 A | * 8/2000 | Walsh | 429/34 |
| 6,270,917 B1 | * 8/2001 | Maeda et al. | 429/37 |
| 6,420,061 B1 | * 7/2002 | Fujii et al. | 429/26 |
| 6,524,735 B1 | * 2/2003 | Wariishi et al. | 429/39 |

FOREIGN PATENT DOCUMENTS

| | | |
|---|---|---|
| JP | 07-263003 A | 10/1995 |
| JP | 09-161821 A | 6/1997 |
| JP | 10-106594 A | 4/1998 |
| JP | 10-172587 A | 6/1998 |
| JP | 11-283639 A | 10/1999 |
| JP | 2000-294261 A | 10/2000 |
| WO | WO 96/00453 A1 | 1/1996 |

* cited by examiner

Primary Examiner—Susy Tsang-Foster
(74) Attorney, Agent, or Firm—Akin Gump Strauss Hauer & Feld, LLP

(57) ABSTRACT

A polymer electrolyte fuel cell comprising a hydrogen-ion conductive polymer electrolyte membrane, an anode and a cathode sandwiching the hydrogen-ion conductive polymer electrolyte membrane, an anode-side conductive separator plate having gas flow channels for supplying a fuel gas to the anode, and a cathode-side conductive separator plate having gas flow channels for supplying an oxidant gas to the cathode, wherein the anode-side and cathode-side conductive separator plates have a substantially rectangular part in contact with the anode or cathode in which the length of a longer side is equal to or more than twice the length of a shorter side, and the oxidant gas flow channels have a linear part formed along the longer side of the rectangular part.

13 Claims, 14 Drawing Sheets

POLYMER ELECTROLYTE FUEL CELL

TECHNICAL FIELD

The present invention relates to a polymer electrolyte fuel cell of the room temperature operation type used for portable power sources, power sources for electric vehicles, domestic cogeneration systems, etc., and it particularly relates to improvements of conductive separator plates used therein.

BACKGROUND ART

A fuel cell comprising a polymer electrolyte generates electric power and heat simultaneously by electrochemically reacting a fuel gas containing hydrogen and an oxidant gas containing oxygen such as air. This fuel cell is basically composed of a pair of electrodes, i.e., an anode and a cathode, formed on both surfaces of a hydrogen-ion conductive polymer electrolyte membrane. The electrode usually comprises a catalyst layer which is composed mainly of carbon particles carrying a metal catalyst such as platinum group metal catalyst and a diffusion layer having both gas permeability and electronic conductivity formed on the outer surface of the catalyst layer.

In order to prevent the fuel gas and oxidant gas supplied to the electrodes from leaking out or prevent these two kinds of gases from mixing together, gaskets are arranged on the periphery of the electrodes in such a manner as to sandwich the polymer electrolyte membrane. The gaskets are combined integrally with the electrodes and polymer electrolyte membrane beforehand. This is called "MEA" (electrolyte membrane-electrode assembly). Disposed outside the MEA are conductive separator plates for mechanically securing the MEA and for connecting adjacent MEAs electrically in series. The separator plates have, at a portion to come in contact with the MEA, a gas flow channel formed for supplying a reaction gas to the electrode surface and removing a generated gas and an excess gas. Although the gas flow channel may be provided separately from the separator plates, grooves are commonly formed on the surfaces of the separator plates to serve as the gas flow channel. Also, since the conductive separator plates are required to have high electronic conductivity, gas tightness and high corrosion resistance, it has been a common practice to process a dense carbon plate or the like to form grooves thereon by cutting, etc., for producing a separator plate.

In the conventional conductive separator plates, the gas flow channel formed thereon is usually of the straight type in which a plurality of linear gas flow channels extend in parallel from the gas inlet toward the gas outlet. In the polymer electrolyte fuel cell, however, water is generated on the air electrode side during its operation, and thus efficient removal of the generated water is essential for the fuel cell to exert its full performance. Therefore, in an attempt to remove the generated water forcibly, the cross sectional area of the gas flow channel of the conductive separator plate is reduced, and the gas flow channel is caused to meander to constitute a serpentine structure in order to increase the length of one gas flow channel, thereby to increase the gas flow rate substantially.

In the actual use of the fuel cell, a large number of unit cells as describe above are usually stacked to constitute a laminated structure. Since the fuel cell generates heat as well as electric power during its operation, a cooling plate is inserted every one to two unit cells in the cell stack to keep the cell temperature constant, while thermal energy produced is utilized, for example, in the form of hot water. The cooling plate commonly has a structure of circulating a heating medium such as cooling water through the inside of a thin metallic plate, but the cooling plate may also have another structure of forming a cooling water flow channel on the backside of the separator plate constituting the unit cell. In this case, an O-ring or a gasket is needed for sealing the heating medium such as cooling water. In such sealing, the O-ring placed between the cooling plates needs to be compressed completely in order to secure sufficient conductivity between the cooling plates.

In such a cell stack, apertures called manifolds are formed in the separator plates in order to inject the fuel gas, oxidant gas and cooling water to each unit cell. A common type is called internal manifold, which has apertures for supplying and discharging cooling water inside the cell stack.

In either case of using the internal manifold or external manifold, it is necessary that a plurality of unit cells including cooling sections are stacked in one direction, that a pair of end plates are arranged at both ends of the stacked cells, and that the two end plates are fixed by clamping rods. As to the clamping, the unit cells are desirably clamped as uniformly within the unit cell as possible. In view of the mechanical strength, the end plates and the clamping rods are usually composed of a metallic material such as stainless steel. These end plates and the clamping rods are electrically insulated from the cell stack by insulating plates so as to constitute a structure where the current is prevented from leaking out through the end plates. As for the clamping rod, it has been suggested that the rod is passed through a through-hole of the separator plate or the whole cell stack including the end plates is clamped by metal belts.

In the aforementioned polymer electrolyte fuel cell, the electrolyte membrane, when humidified with water, functions as an electrolyte, and therefore the fuel gas and the oxidant gas to be supplied need to be humidified before being supplied. In the polymer electrolyte membrane, the ionic conductivity increases with increasing water content in a temperature range of up to at least 100° C., so that the internal resistance of the cell is reduced to improve the output. Thus, in order to increase the water content of the electrolyte membrane, the supply gases need to be highly humidified before being supplied.

However, supplying the highly humidified gases above the cell operating temperature causes condensation of water within the cell, so that the water drops disturb smooth supply of the gas; on the air electrode side to which the oxidant gas is supplied, water generation as a result of electric power generation lowers the removal efficiency of the generated water, thereby deteriorating the cell performance. This is why the gases are usually humidified so as to have a dew point equal to or lower than the cell operating temperature and are supplied.

The supply gases are generally humidified by a bubbler humidification system where a supply gas is caused to bubble up in deionized water maintained at a predetermined temperature for humidification or a membrane humidification system where deionized water maintained at a predetermined temperature is flown to one side of an electrolyte membrane while a supply gas is flown to the other side for humidification. When a gas prepared by steam reforming a fossil fuel such as methanol or methane is used as the fuel gas, such humidification may be unnecessary in some cases since the reformed gas contains steam.

The humidified fuel and oxidant gases are supplied to the polymer electrolyte fuel cell and used for electric power generation. At this time, within a unit cell of the cell stack, current density distribution occurs. To be more specific, while the fuel gas humidified in a predetermined manner at the gas supply inlet is supplied, hydrogen in the fuel gas is consumed for electric power generation, so that the more upstream of the gas, the higher the hydrogen partial pressure becomes and the lower the steam partial pressure becomes. Accordingly, the more downstream of the gas, the lower the hydrogen partial pressure becomes and the higher the steam partial pressure becomes.

Also, while the oxidant gas humidified in a predetermined manner at the gas supply inlet is supplied, oxygen in the oxidant gas is consumed for electric power generation and water is generated as a result of electric power generation. Consequently, the more upstream of the gas, the higher the oxygen partial pressure becomes and the lower the steam partial pressure becomes, whereas the more downstream of the gas, the lower the oxygen partial pressure becomes and the higher the steam partial pressure becomes. Moreover, with respect to the temperature of cooling water for cooling the cells, the closer to the inlet, the lower it becomes, whereas the closer to the outlet, the higher it becomes, so that temperature distribution occurs within the unit cell. This is why current density distribution occurs within the unit cell.

As described above, when the unevenness of the hydrogen and steam partial pressures in the fuel gas, the unevenness of the oxygen and steam partial pressures in the oxidant gas, the temperature distribution, etc., become excessive within the unit cell, the cell performance is greatly deteriorated due to excessive dryness or overdry, or excessive wetness or overflooding.

Further, a phenomenon of coexistence of the overdry and the overflooding within the unit cell occurs also due to the unevenness of the hydrogen and steam partial pressures in the fuel gas, the unevenness of the oxygen and steam partial pressures in the oxidant gas, the temperature distribution within the unit cell, etc., which are caused by the above-mentioned reasons.

In a stack of a large number of cells, occurrence of the above problem in a part of the cell stack may interfere with the operation of the whole cell stack. Specifically, when a part of the cell stack becomes overflooded, the loss of gas supply pressure increases in the overflooded cell. Since the manifolds for gas supply are shared in the cell stack, the gas does not flow smoothly into the overflooded cell, consequently increasing the overflooding.

On the other hand, when a part of the cell stack becomes overdried, the loss of gas supply pressure decreases in the overdried cell. Thus, the gas flows smoothly into the overdried cell, consequently increasing the overdry.

The above-described problem often results from the fact that the steam partial pressure in the gas is higher on the gas outlet side than on the gas inlet side on both the fuel electrode side to which the fuel gas is supplied and the air electrode side to which the oxidant gas is supplied. Therefore, as disclosed in Japanese Laid-Open Patent Publication No. Hei 9-511356, the flowing direction of the oxidant gas was made the same as that of the cooling water to make the downstream temperature of the oxidant gas higher than the upstream temperature due to temperature distribution of the cooling water, in an attempt to suppress the overflooding downstream of the air electrode and reduce the current density distribution within the unit cell.

The polymer electrolyte fuel cell, when used as the electric vehicle power source, is required to be compact, lightweight and inexpensive. Also, when used as the domestic cogeneration system, it is required to be compact, highly efficient and inexpensive. In either case, the fuel cell is intended to be used with a reformer, supply gas humidifier, exhaust heat recovery/converter/inverter, etc., as a system; in order to make the whole system more compact, the polymer electrolyte fuel cell is required to be more compact, and limitations are imposed on the shape of the installation space of the cell. The requirement for a thinner cell becomes stronger especially when the cell is installed in a lower part of the body of an electric vehicle as the power source.

Further, when the conductive separator plate is composed of a carbon material, the process of forming a gas flow channel by cutting is costly; thus, an attempt has been made in which a carbon powder, carbon fiber or the like is mixed with a resin and is molded by a process such as hot pressing without baking it at a high temperature. Such molded carbon, however, has a disadvantage that it has a lower mechanical strength and is more fragile than the baked carbon separator.

Meanwhile, when the polymer electrolyte fuel cell is used for a relatively small-sized cogeneration system such as domestic cogeneration system, the power of auxiliaries, for example, for supplying air has a major influence on the efficiency of the whole system. Thus, in order to reduce the power of a blower for supplying air to the air electrode side or other auxiliaries, there is a need to reduce the pressure loss in supplying air to the air electrode. The reduction of the pressure loss on the air electrode side requires enlargement of the cross sectional area of the gas flow channel in the air-electrode-side separator plate; from this viewpoint, the serpentine type flow channel is inadequate for the small-sized cogeneration system. However, the inventors of the present invention have found that in the case where the portion of the conductive separator plate in contact with the electrode has a shape like a square or circle, the cell is unable to exert its performance sufficiently if the gas flow channel on the air electrode side is of the straight type. This is because it is not possible to increase the gas flow rate sufficiently. Then, in order to increase the gas flow rate while using the straight type flow channel, the inventors have tried reducing the depth of the gas flow channel to find that when the depth is less than 0.4 mm, the gasket and diffusion layer of the electrode partially fall into the gas flow channel to undesirably hamper or inhomogeninize the flow of the gas.

Also, in the case where the portion of the separator plate in contact with the electrode has a rectangular shape, if the length of the longer side is equal to or more than six times that of the shorter side and the gas flow channel on the air electrode side is of the serpentine type, the loss of gas supply pressure becomes too large. When the pressure loss at the gas inlet becomes large, the relative humidity at the gas inlet becomes too high in comparison with that of the gas outlet, so that the cell is unable to exert its performance sufficiently.

Further, another problem arises that depending on the cross sectional area of the gas flow channel, the loss of gas supply pressure becomes large and necessary auxiliary power accordingly becomes too large. Then, when the cross sectional area of the gas flow channel is enlarged to reduce the loss of gas supply pressure, if the width of the gas flow groove is enlarged, the actual contact area of the separator plate and the electrode is reduced to increase the contact resistance. Also, the interval between the portions supporting the electrode becomes wider, thereby to increase the contact resistance between the electrode and the electrolyte membrane. If the depth of the groove of the gas flow channel is enlarged, the thickness of the separator plate is inevitably enlarged, making it impossible to make the whole cell compact. Further, other problems arise that the diffusion of the supply gas throughout the electrode surface is hindered and the gas utilization efficiency is aggravated, thereby to increase the reaction resistance of the electrodes.

Furthermore, in order to make the whole fuel cell stack more compact, it is indispensable to increase the ratio of the effective area of the electrode to the area of the separator plate. For such purpose, when a rectangular conductive separator plate is used, the portion of the separator plate in contact with the electrode inevitably has a rectangular shape in correspondence with the shape of the separator plate.

The inventors of the present invention have made various examinations of the rectangular conductive separator plate and found the followings.

When the linear part of the gas flow channel is arranged in parallel with the shorter sides of the rectangular separator plate, condensed water such as generated water cannot be removed efficiently, so that the cell is unable to exert its performance sufficiently. In the construction of the serpentine flow channel, in particular, when the linear part of the flow channel is arranged in parallel with the shorter sides of the rectangular separator plate, the flow channel makes more turns than when the linear part of the serpentine flow channel is arranged in parallel with the longer sides of the rectangular separator plate, so that the pressure loss is increased and the removal efficiency of water or generated water in the gas is deteriorated even when the flow channel is formed to have the same cross sectional area, which results in deterioration of the cell performance.

DISCLOSURE OF INVENTION

In view of the above, the present invention provides a polymer electrolyte fuel cell comprising improved conductive separator plates that are rectangular.

A polymer electrolyte fuel cell in accordance with the present invention comprises a hydrogen-ion conductive polymer electrolyte membrane, an anode and a cathode sandwiching the hydrogen-ion conductive polymer electrolyte membrane, an anode-side conductive separator plate having gas flow channels for supplying a fuel gas to the anode, and a cathode-side conductive separator plate having gas flow channels for supplying an oxidant gas to the cathode; it is characterized in that the anode-side and cathode-side conductive separator plates have a substantially rectangular part in contact with the anode or cathode in which the length of a longer side is equal to or more than twice the length of a shorter side, and the oxidant gas flow channels have a linear part formed along the longer side of the rectangular part.

In a preferred mode, the cathode-side conductive separator plate has a plurality of oxidant gas flow channels which are substantially linear and continuous along the longer side from one of the shorter sides toward the other of the shorter sides.

In another preferred mode, the cathode-side conductive separator plate has an inlet manifold formed in the vicinity of one of the shorter sides so as to communicate with the gas flow channels and an outlet manifold formed in the vicinity of the other of the shorter sides so as to communicate with the gas flow channels, and the inlet manifold and outlet manifold have an opening having a width which is almost equal to or more than the sum of the widths of the gas flow channels communicating with the manifold.

In another preferred mode, the oxidant gas flow channels have a serpentine structure composed of a plurality of linear, parallel gas flow channels along the longer side of the cathode-side conductive separator plate and at least one turn where the gas flow channels make a turn, and the turn is located in the vicinity of the shorter side of the cathode-side conductive separator plate.

In another preferred mode, the cathode-side conductive separator plate has, on the backside, cooling water flow channels having a linear part along the longer side of the rectangular part, and the flow direction of the oxidant gas in the linear part of the gas flow channels is in substantial agreement with the flow direction of the cooling water in the linear part of the cooling water flow channels.

In another preferred mode, the fuel gas flow channels have a serpentine structure composed of a plurality of linear, parallel gas flow channels along the longer side of the anode-side conductive separator plate and at least one turn where the gas flow channels make a turn, and the turn is located in the vicinity of the shorter side of the anode-side conductive separator plate. In this case, the oxidant gas flow channels have two turns, and the fuel gas flow channels have two or four turns.

In another preferred mode, the anode-side and cathode-side conductive separator plates have a part in contact with the anode or cathode in which the length of the longer side is equal to or less than six times the length of the shorter side.

In another preferred mode, the anode-side and cathode-side conductive separator plates have respective manifolds for supplying and discharging the oxidant gas, the fuel gas and cooling water to and from the oxidant gas flow channels, the fuel gas flow channels and cooling water flow channels, the respective manifolds being arranged in the vicinity of the shorter side.

In another preferred mode, in the anode-side and cathode-side conductive separator plates, the fuel gas and oxidant gas flow channels have a width of 1.5 mm or more to 2.5 mm or less and a depth of 0.4 mm or more to 1 mm or less, and a rib between the flow channels has a width of 0.5 mm or more to 1.5 mm or less.

In another preferred mode, grooves constituting the gas flow channels or cooling water flow channels are across the central part on both sides of the separator plate, and the position of the center line of a convex between the grooves on one side of the separator plate is in substantial agreement with the position of the center line of a convex between the grooves on the other side except for unavoidable portions.

BEST MODE FOR CARRYING OUT THE INVENTION

Figure 1:
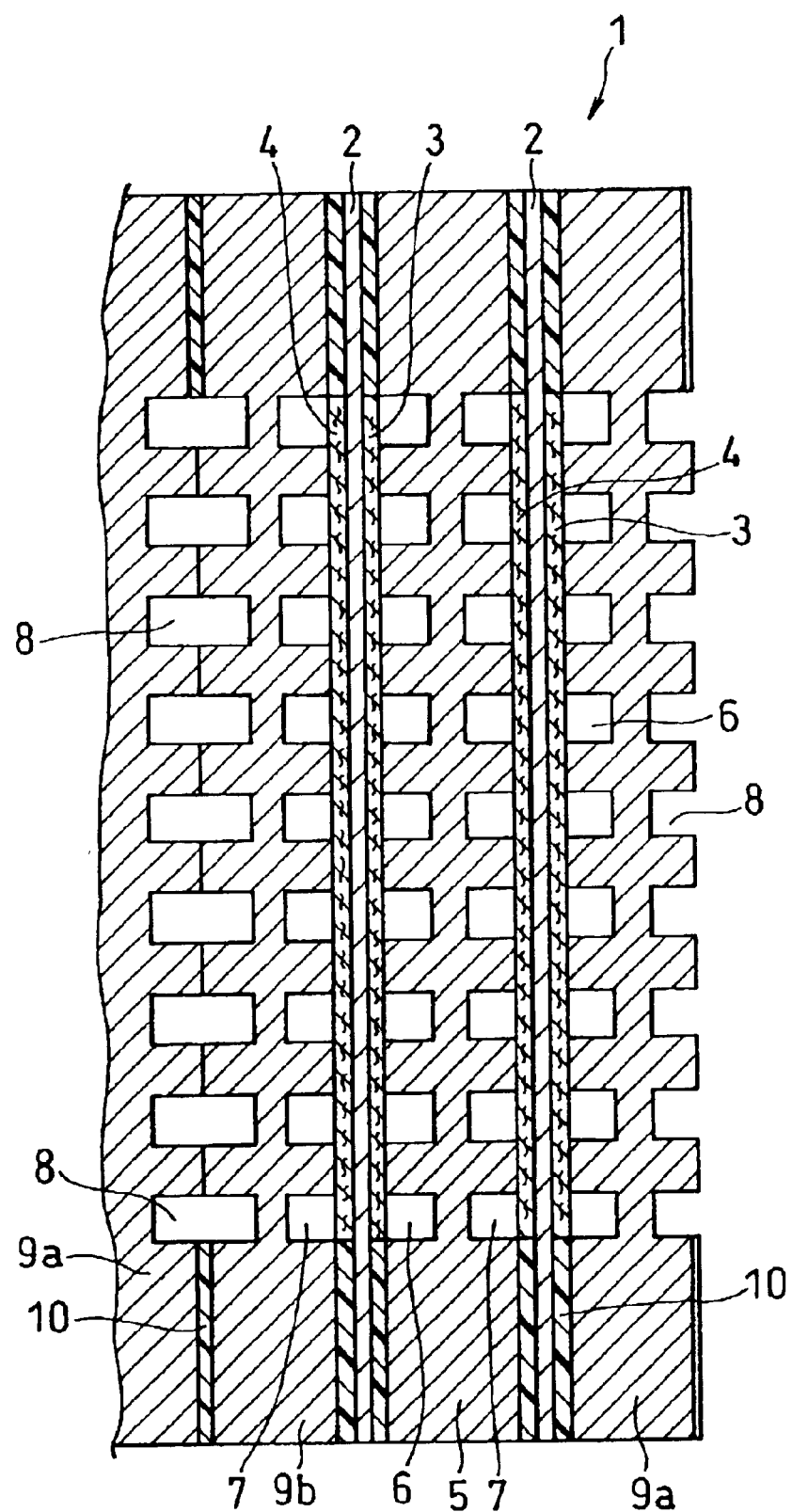
FIG. 1 is a longitudinal cross sectional view of the main part of a fuel cell in an example of the present invention.

A polymer electrolyte fuel cell in accordance with the present invention comprises a hydrogen-ion conductive polymer electrolyte membrane, an anode and a cathode sandwiching the hydrogen-ion conductive polymer electrolyte membrane, an anode-side conductive separator plate having gas flow channels for supplying a fuel gas to the anode, and a cathode-side conductive separator plate having gas flow channels for supplying an oxidant gas to the cathode, wherein the anode-side and cathode-side conductive separator plates have a substantially rectangular part in contact with the anode or cathode in which the length of a longer side is equal to or more than twice the length of a shorter side, and the oxidant gas flow channels have a linear part formed along the longer side of the rectangular part.

The present invention uses the conductive separator plate having a substantially rectangular part in contact with the electrode in which the length of the longer side is equal to or more than twice the length of the shorter side. Accordingly, it uses a rectangular electrode. This makes it possible to make the height of a cell stack low, that is, to make the cell stack thin, by placing the longer side of the rectangular part on the installation ground. The length of the longer side of the rectangular part is preferably two to six times that of the shorter side and more preferably three to six times. The shorter side of the rectangular electrode is preferably 10 cm or less. Such a thin cell stack is advantageously installed particularly in a lower part of the body of an electric vehicle as a power source.

The linear part of the gas flow channels of the separator plate is formed along the longer side of the separator plate, so that the loss of gas supply pressure can be reduced. Particularly in a cell in which air is used as the oxidant gas and a high-concentration hydrogen gas is used as the fuel gas, it is required to supply a large amount of air in comparison with the fuel. In order to meet this requirement, the oxidant gas flow channels are formed in a substantially linear form extending along the longer side of the separator plate or are formed to have a serpentine structure composed of linear parts along the longer side and a small number of turns such as two turns, so that the pressure loss can be kept small. In order to efficiently remove water generated as a result of electrode reaction on the cathode, it is usually required to increase the supply pressure of the oxidant gas. According to the present invention, efficient removal of the generated water is possible while the loss of air supply pressure is kept small. Also, the cathode-side conductive separator plate has, on the backside, cooling water flow channels having a linear part extending along the longer side of the rectangular part, and the flow direction of the oxidant gas in the linear part of the gas flow channels is in substantial agreement with the flow direction of the cooling water in the linear part of the cooling water flow channels, so that removal of the generated water is promoted.

Although the fuel gas flow channels may have a serpentine structure composed of linear parts along the shorter side of the separator plate and turns arranged along the longer side, they preferably have a serpentine structure composed of linear parts along the longer side and turns arranged along the shorter side in the same manner as in the oxidant gas flow channels. When the oxidant gas and fuel gas flow channels have the serpentine structure composed of linear parts along the longer side and turns arranged along the shorter side, it is most preferred that the oxidant gas flow channels have two turns and the fuel gas flow channels have two or four turns. In this case, the cooling water flow channels preferably have a similar serpentine structure.

In the separator plate having the above-described structure, grooves constituting the gas flow channels or cooling water flow channels are across the central part on both sides of the separator plate. Thus, in such an arrangement of the grooves, the use of a material having a low bending strength for the separator plate may cause cracking or the like to impair the cell service life. In the present invention, the center line of a convex between the grooves on one side of the separator plate is in substantial agreement with the center line of a convex between the grooves on the other side except for unavoidable portions, so that a decrease in strength is suppressed. Although it is conventionally considered that the separator plate should have a bending strength of at least 100 Pa, the structure of the present invention as describe above can realize the practical use of a separator plate having a bending strength of about 70 Pa, which is lower than 100 Pa.

The grooves of the gas flow channels formed on the surface of the conductive separator plate preferably have a width of 1.5 to 2.5 mm, and a rib between the grooves preferably has a width of 0.4 to 1.5 mm. This makes it possible to keep the contact resistance between the grooves and the electrode or electrolyte membrane small and to suppress the loss of gas supply pressure.

Manifolds for supplying and discharging the oxidant gas, fuel gas and cooling water are preferably provided in the vicinity of the shorter side of the rectangular separator plate.

The present invention realizes a thin, compact fuel cell stack and enables reduction in loss of gas supply pressure.

In the following, the structure of the conductive separator plate will be described in detail with reference to drawings. The drawings, however, are illustrated schematically for reference and are therefore not necessarily accurate in size and relative position of each element.

Embodiment 1

FIG. 1 is a cross sectional view illustrating the main part of a fuel cell in this embodiment.

A fuel cell 1 is composed of unit cells comprising a hydrogen-ion conductive polymer electrolyte membrane 2 and a cathode 3 and an anode 4 sandwiching the electrolyte membrane 2, the unit cells being stacked with a conductive separator plate interposed therebetween. The conductive separator plates inserted between the cells comprises: a single separator plate 5 having oxidant gas flow channels 6 on one side and fuel gas flow channels 7 on the other side and thus having both functions of a cathode-side separator plate and an anode-side separator plate; and a composite separator plate composed of a separator plate 9a having the oxidant gas flow channels 6 on one side and cooling water flow channels 8 on the other side and a separator plate 9b having the cooling water flow channels 8 on one side and the fuel gas flow channels 7 on the other side. In this embodiment, the composite separator plate is inserted for cooling water circulation every two cells. Numeral 10 represents a gasket for preventing leakage of gases and cooling water.

The conductive separator plates used for the fuel cell will be described in detail with reference to FIGS. 2 to 4.

Figure 2:
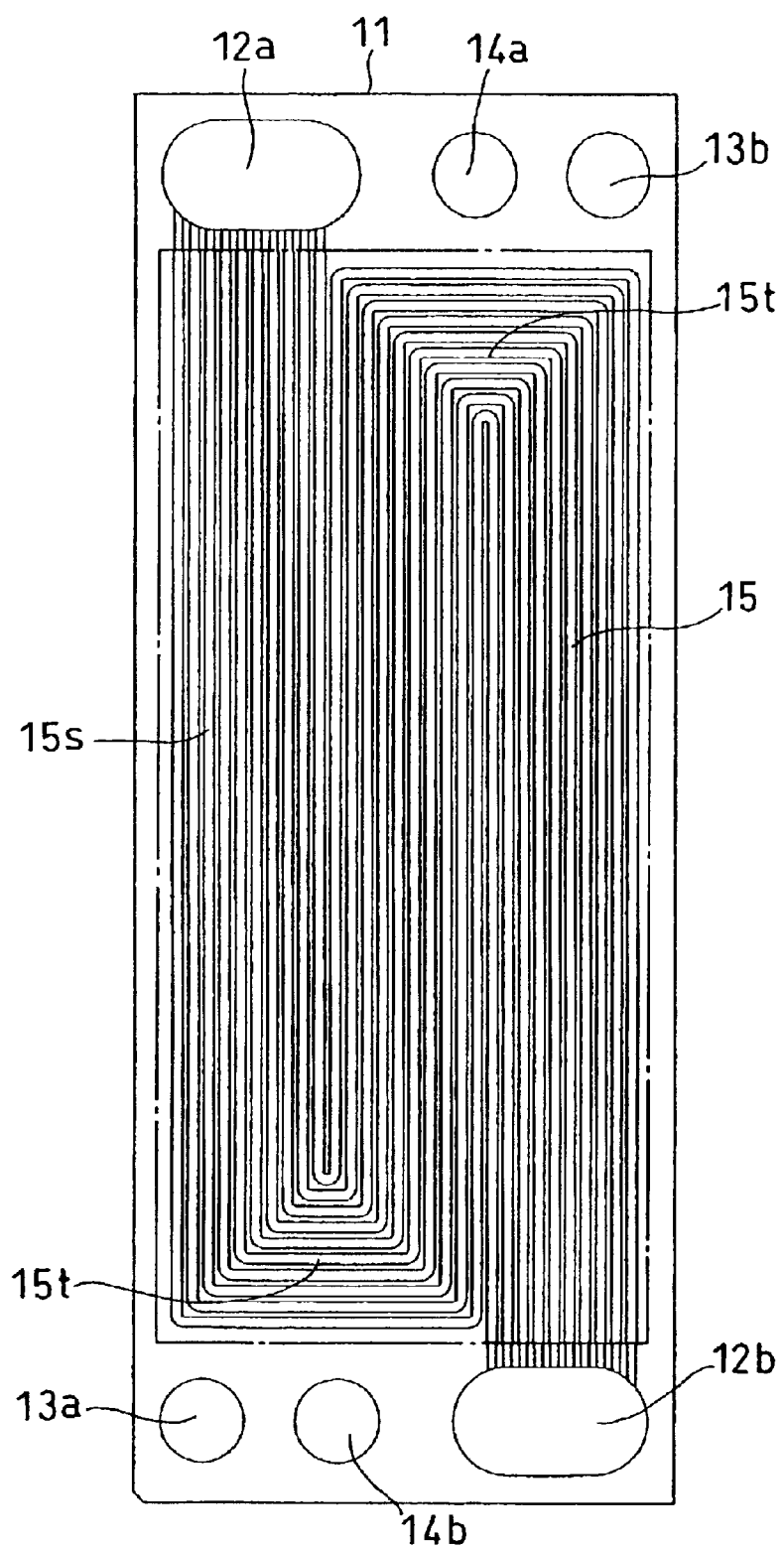
FIG. 2 is a front view of a cathode-side conductive separator plate of the cell.

A cathode-side conductive separator plate 11 as shown in FIG. 2 is a rectangle, wherein an oxidant gas inlet manifold 12a, a fuel gas outlet manifold 13b, and a cooling water inlet manifold 14a are arranged along one shorter side of the rectangle and an oxidant gas outlet manifold 12b, a fuel gas inlet manifold 13a, and a cooling water outlet manifold 14b are arranged along the other shorter side thereof. On the surface of the separator plate 11, grooves are provided by cutting or press-molding, thereby to form gas flow channels 15 which communicate with the oxidant gas inlet manifold 12a and the outlet manifold 12b. The gas flow channels 15 are composed of 10 parallel grooves in this example. The gas flow channels 15 have a serpentine structure composed of linear parts 15s and turns 15t where the gas flow channels make a turn and the number of turns is two.

Figure 3:
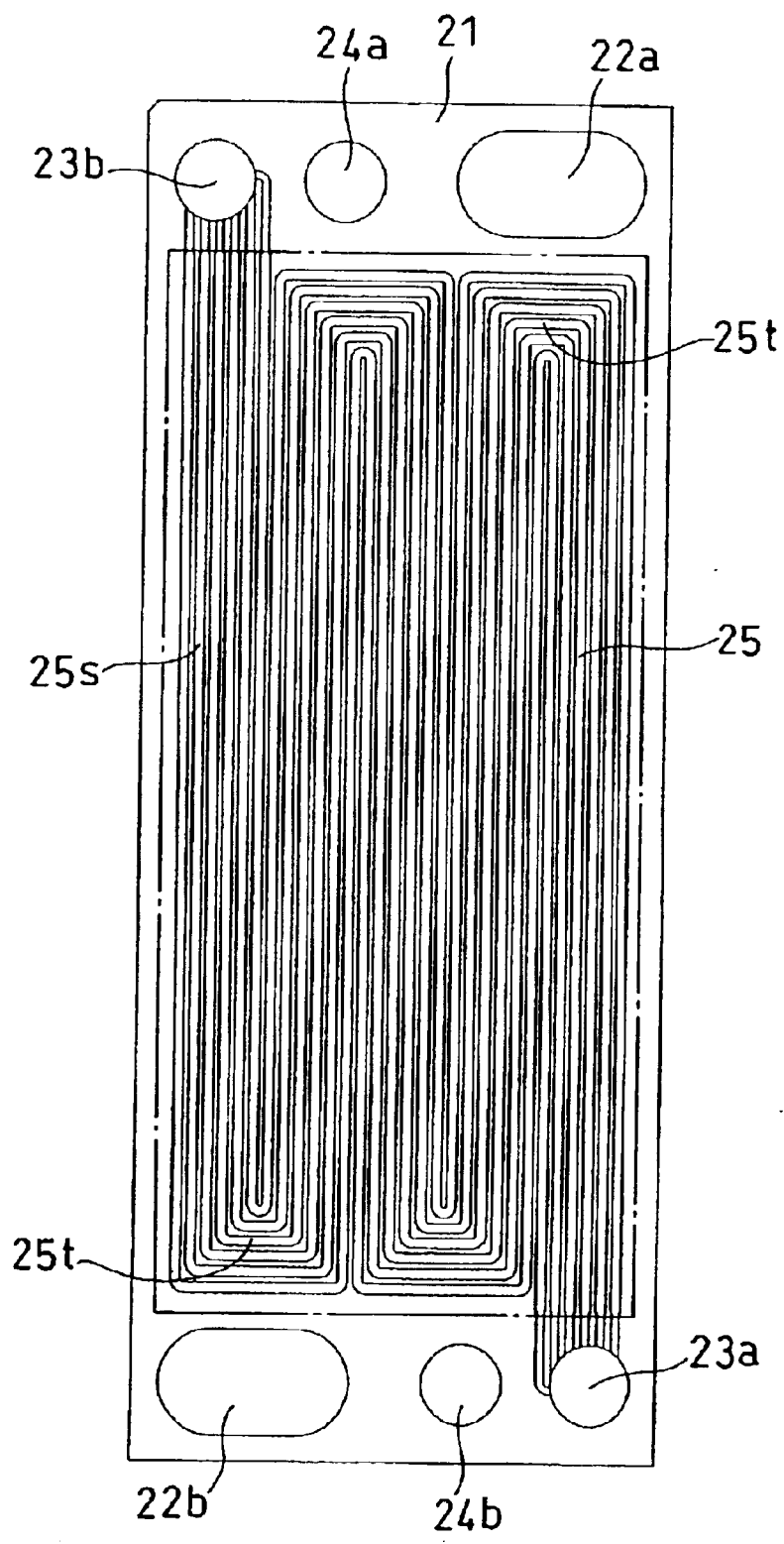
FIG. 3 is a front view of an anode-side conductive separator plate of the cell.

An anode-side separator plate 21 as shown in FIG. 3 is also a rectangle like the separator plate 11, wherein an oxidant gas inlet manifold 22a, a fuel gas outlet manifold 23b, and a cooling water inlet manifold 24a are arranged along one shorter side of the rectangle and an oxidant gas outlet manifold 22b, a fuel gas inlet manifold 23a, and a cooling water outlet manifold 24b are arranged along the other shorter side thereof. On the surface of the separator plate 21, grooves are provided by cutting or press-molding, thereby to form gas flow channels 25 which communicate with the fuel gas inlet manifold 23a and the outlet manifold 23b. The gas flow channels 25 are composed of six parallel grooves. The gas flow channels 25 have a serpentine structure composed of liner parts 25s and turns 25t where the gas flow channels make a turn and the number of turns is four.

Figure 4:
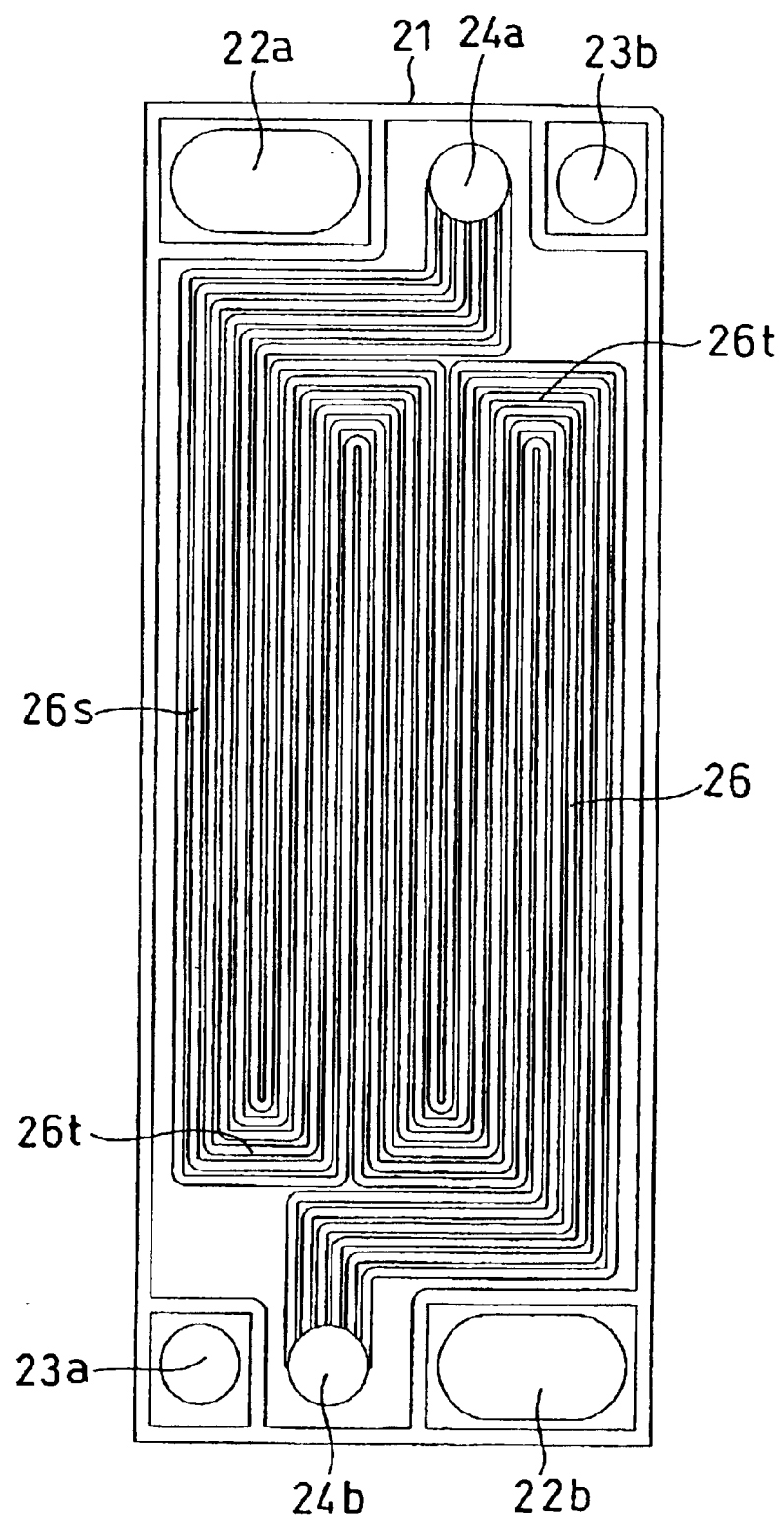
FIG. 4 is a backside view of the separator plate.

As shown in FIG. 4, the anode-side separator plate 21 has, on the backside thereof, cooling water flow channels 26 communicating with the cooling water inlet manifold 24a and the outlet manifold 24b. The flow channels 26 are composed of six parallel grooves in this example. The flow channels 26 have a serpentine structure composed of liner parts 26s and turns 26t where the flow channels make a turn and the number of turns is four.

As described in FIG. 1, the separator plate inserted between the cells is a separator plate of FIG. 2 further having fuel gas flow channels as illustrated in FIG. 3 on the backside. Also, a cooling section is constituted by a composite separator plate composed of the anode-side separator plate 21 having cooling water flow channels on the backside as illustrated in FIGS. 3 and 4 and the cathode-side separator plate 11 of FIG. 2 further having cooling water flow channels as illustrated in FIG. 4 on the backside.

In the cathode-side separator plate 11 and anode-side separator plate 21, the rectangle surrounded by the dashed line in the figures is a portion at which they come in contact with the cathode or anode. The oxidant gas flow channels 15 are composed of 10 parallel grooves, and three linear parts 15s are connected by two turns 15t. In other words, there are 30 grooves extending linearly along the longer side of the above-mentioned rectangle. The fuel gas flow channels 25 are composed of six parallel grooves, and five linear parts 25s are connected by four turns 25t. In other words, the gas flow channels 25 have 30 grooves extending linearly along the longer side of the rectangle. Similarly, the cooling water flow channels also have 30 grooves extending linearly along the longer side of the rectangle. Thus, in the separator plate having the oxidant gas flow channels on one side and the fuel gas flow channels on the other side, it is possible to bring the center lines of the grooves constituting the linear parts of the respective gas flow channels in agreement with each other. Similarly, in the separator plate having the oxidant gas or fuel gas flow channels on one side and the cooling water flow channels on the other side, it is possible to bring the center lines of the grooves constituting the respective flow channels in agreement with each other.

This embodiment has shown a preferred one in which the grooves constituting the gas flow channels and cooling water flow channels have the same width as in FIG. 1. It is needless to say, however, the width and depth of the grooves should be varied so as to be suited for the respective flow channels. In any case, it is important to bring the center lines of convex portions or ribs positioned between the grooves constituting the linear parts of the flow channels in agreement with each other, except for unavoidable portions. Such an arrangement makes it possible to use a material having a bending strength lower than about 100 Pa for the conductive separator plate.

Embodiment 2

The following will describe another preferred embodiment of the conductive separator plate.

Figure 5:
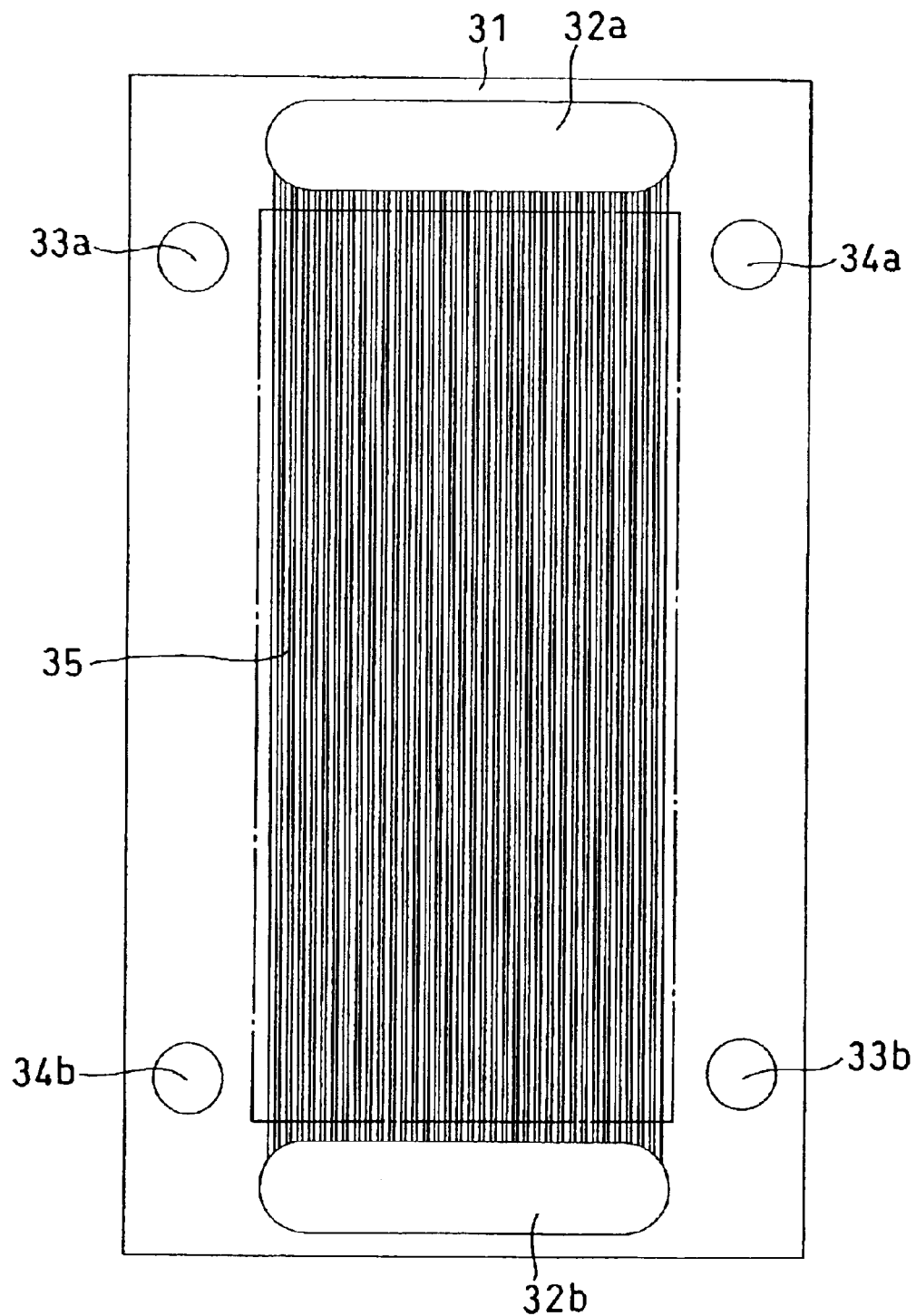
FIG. 5 is a front view of a cathode-side conductive separator plate in another example.

FIG. 5 is a front view of a cathode-side conductive separator plate. A separator plate 31 is a rectangle, wherein an oxidant gas inlet manifold 32a, a fuel gas inlet manifold 33a, and a cooling water inlet manifold 34a are arranged along one shorter side of the rectangle and an oxidant gas outlet manifold 32b, a fuel gas outlet manifold 33b, and a cooling water outlet manifold 34b are arranged along the other shorter side thereof. Gas flow channels 35 communicating with the oxidant gas inlet manifold 32a and the outlet manifold 32b are composed of 35 linear grooves.

Figure 6:
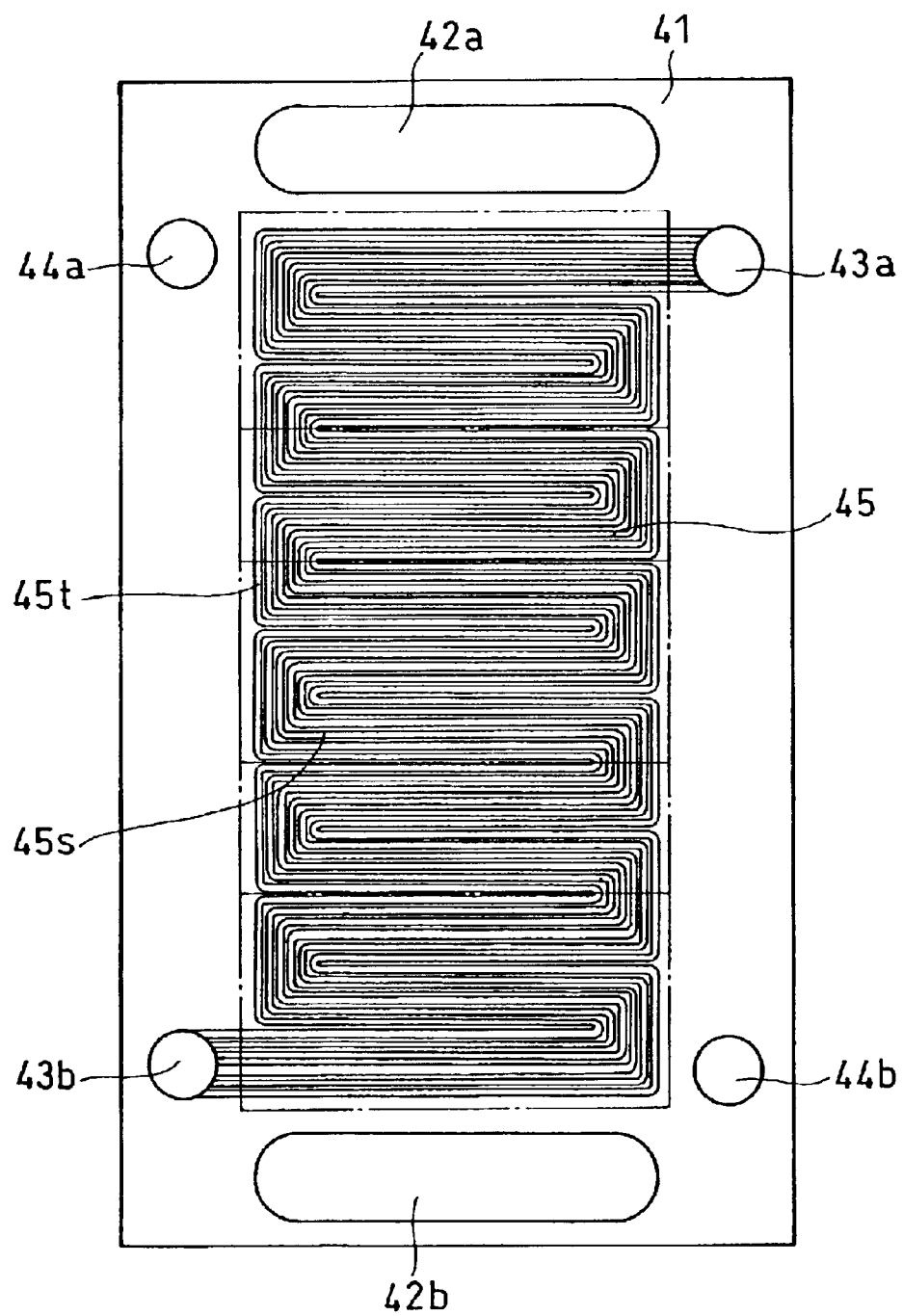
FIG. 6 is a front view of an anode-side conductive separator plate.

FIG 6 is a front view of an anode-side conductive separator plate. A separator plate 41 is a rectangle, wherein an oxidant gas inlet manifold 42a, a fuel gas inlet manifold 43a, and a cooling water inlet manifold 44a are arranged along one shorter side of the rectangle and an oxidant gas outlet manifold 42b, a fuel gas outlet manifold 43b, and a cooling water outlet manifold 44b are arranged along the other shorter side thereof. Gas flow channels 45 communicating with the fuel gas inlet manifold 43a and the outlet manifold 43b are composed of six parallel grooves. The gas flow channels 45 have a serpentine structure composed of liner parts 45s and turns 45t where the gas flow channels make a turn and the number of turns is 12.

When the cathode-side conductive separator plate 31 of FIG. 5 is combined with the anode-side conductive separator plate 41 of FIG. 6, the flow rate of gases can be easily adjusted in a fuel cell in which air containing about 20% oxygen actually participating in reaction is used as the oxidant gas and a gas containing a high concentration of hydrogen is used as the fuel gas. It is preferable that cooling water flow channels have a serpentine structure similar to that of the fuel gas flow channels, that the width of the cooling water flow channels is more than that of the fuel gas flow channels and that the number of turns is less than that of the fuel gas flow channels.

Embodiment 3

Figure 7:
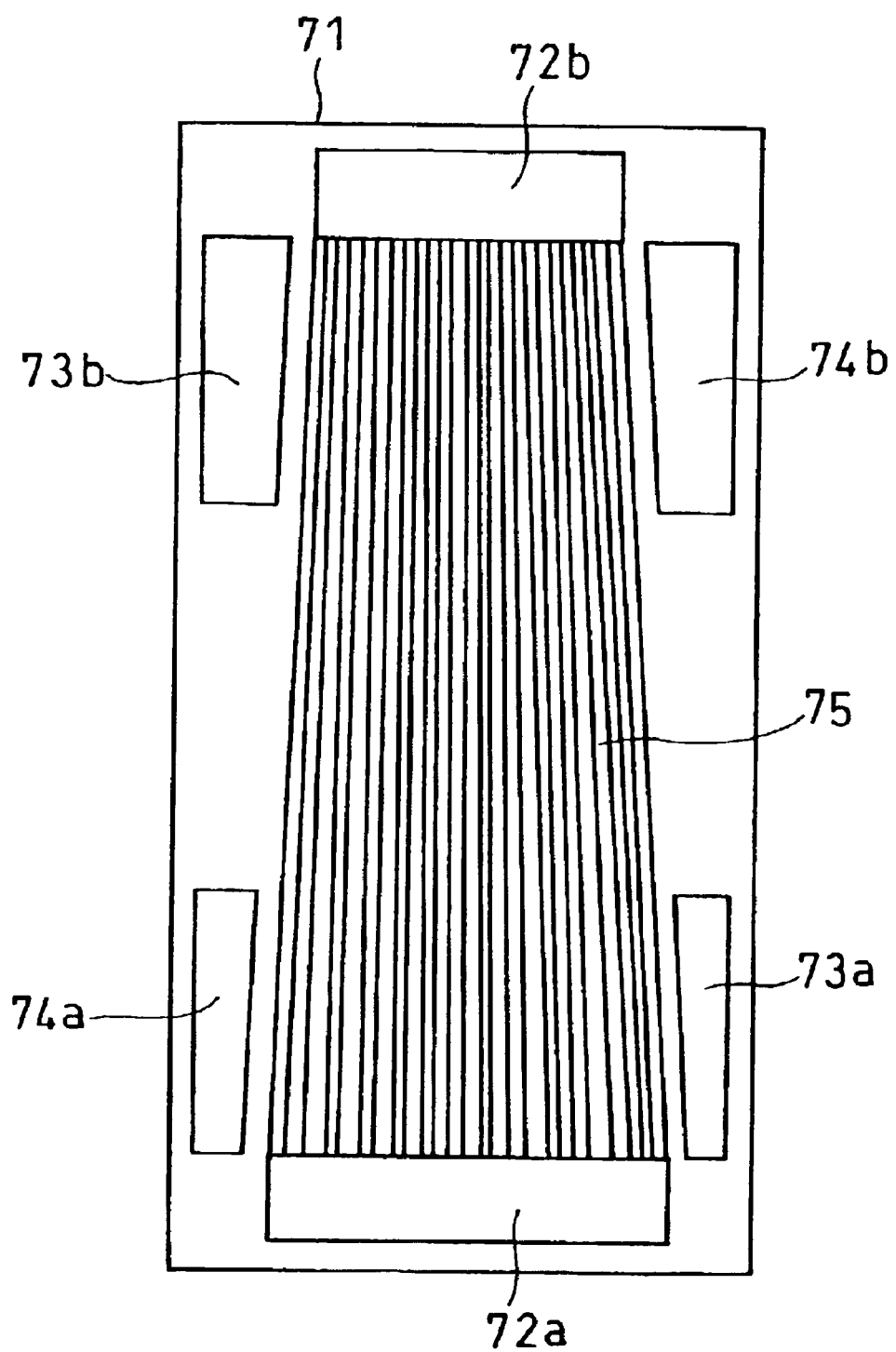
FIG. 7 is a front view of a cathode-side conductive separator plate in still another example.
Figure 8:
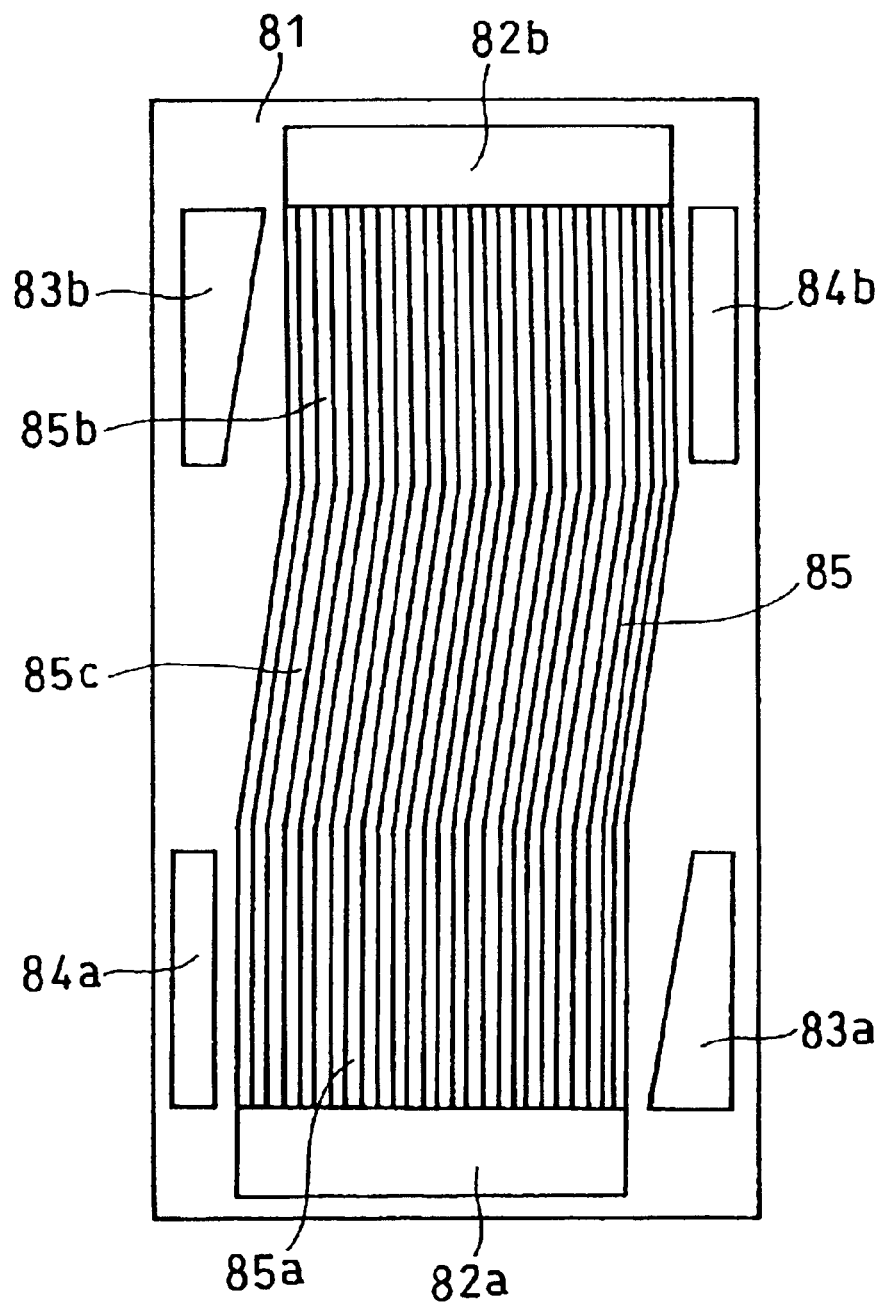
FIG. 8 is a front view of a cathode-side conductive separator plate in still another example.
Figure 9:
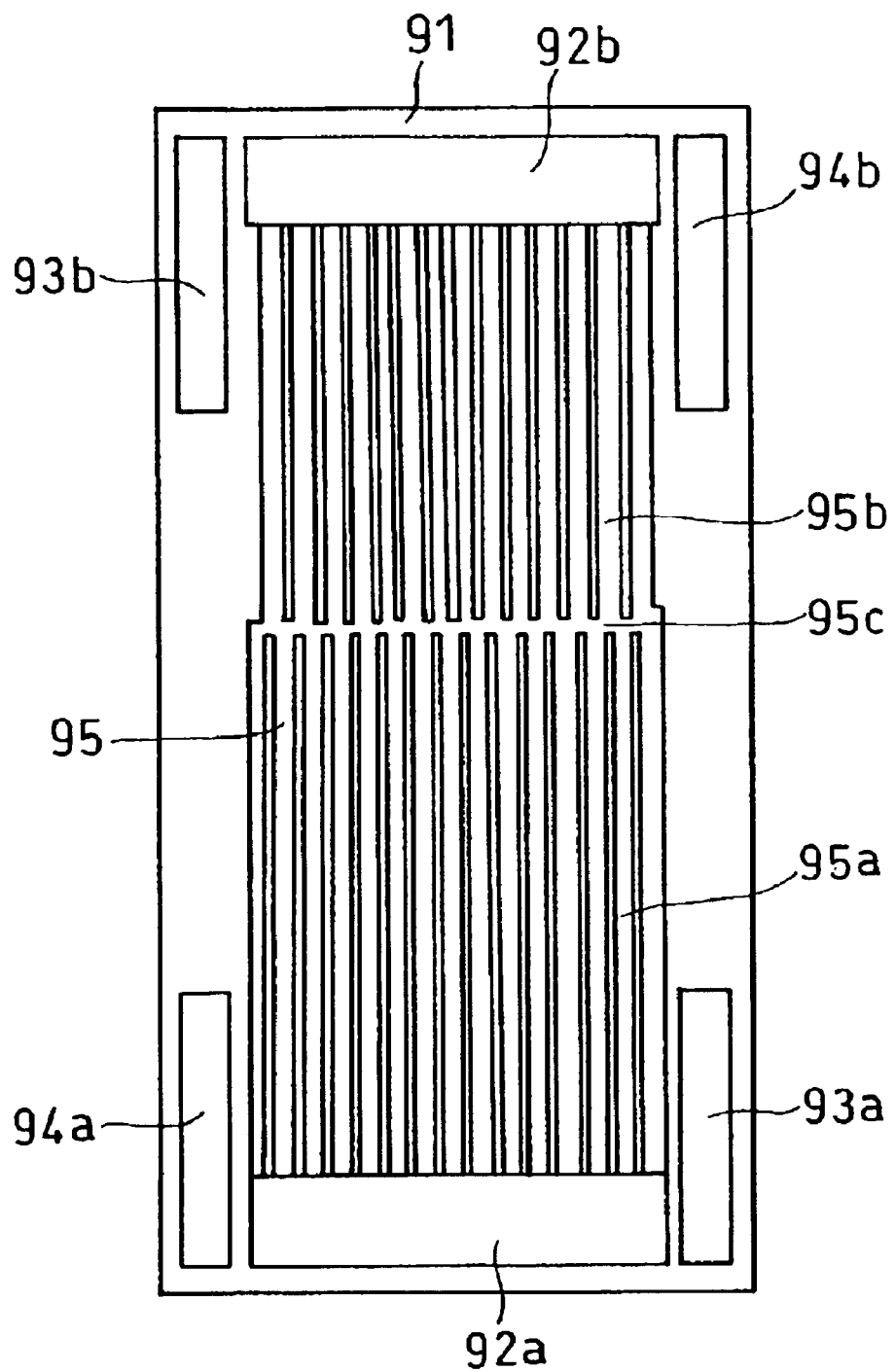
FIG. 9 is a front view of a cathode-side conductive separator plate in still another example.

The following will describe another preferred embodiment of the cathode-side conductive separator plate with reference to FIGS. 7 to 9.

A separator plate 71 as shown in FIG. 7 has an oxidant gas inlet manifold 72a and an oxidant gas outlet manifold 72b along the shorter sides; in the vicinity of these manifolds along the longer sides, it has a fuel gas inlet manifold 73a, a fuel gas outlet manifold 73b, a cooling water inlet manifold 74a and a cooling water outlet manifold 74b. Gas flow channels 75 communicating with the oxidant gas inlet manifold 72a and the outlet manifold 72b are composed of linear grooves having a tapering width. Fuel gas flow channels and cooling water flow channels have a serpentine structure composed of liner parts and turns similar to FIG. 6.

Embodiment 4

A separator plate 81 as shown in FIG. 8 has an oxidant gas inlet manifold 82a and an oxidant gas outlet manifold 82b along the shorter sides: in the vicinity of these manifolds along the longer sides, it has a fuel gas inlet manifold 83a, a fuel gas outlet manifold 83b, a cooling water inlet manifold 84a and a cooling water outlet manifold 84b. Oxidant gas flow channels 85, communicating with the inlet manifold 82a and the outlet manifold 82b, are composed of linear parts 85a and 85b in parallel with the longer sides and a linear part 85c connecting both parts, and the linear part 85c is slightly inclined relative to the longer sides.

Embodiment 5

A separator plate 91 as shown in FIG. 9 has an oxidant gas inlet manifold 92a and an oxidant gas outlet manifold 92b along the shorter sides: in the vicinity of these manifolds along the longer sides, it has a fuel gas inlet manifold 93a, a fuel gas outlet manifold 93b, a cooling water inlet manifold 94a and a cooling water outlet manifold 94b. Oxidant gas flow channels 95 are composed of linear parts 95a and 95b communicating with the inlet manifold 92a and the outlet manifold 92b, respectively, and a part 95c connecting both parts. Grooves of the linear parts 95a and 95b have the same width, but the number of the grooves of the latter is less than the former by one. In this arrangement, the oxidant gas flow channels have a break 95c but are substantially linear.

The following will describe examples of the present invention with reference to drawings.

EXAMPLE 1

Figure 10:
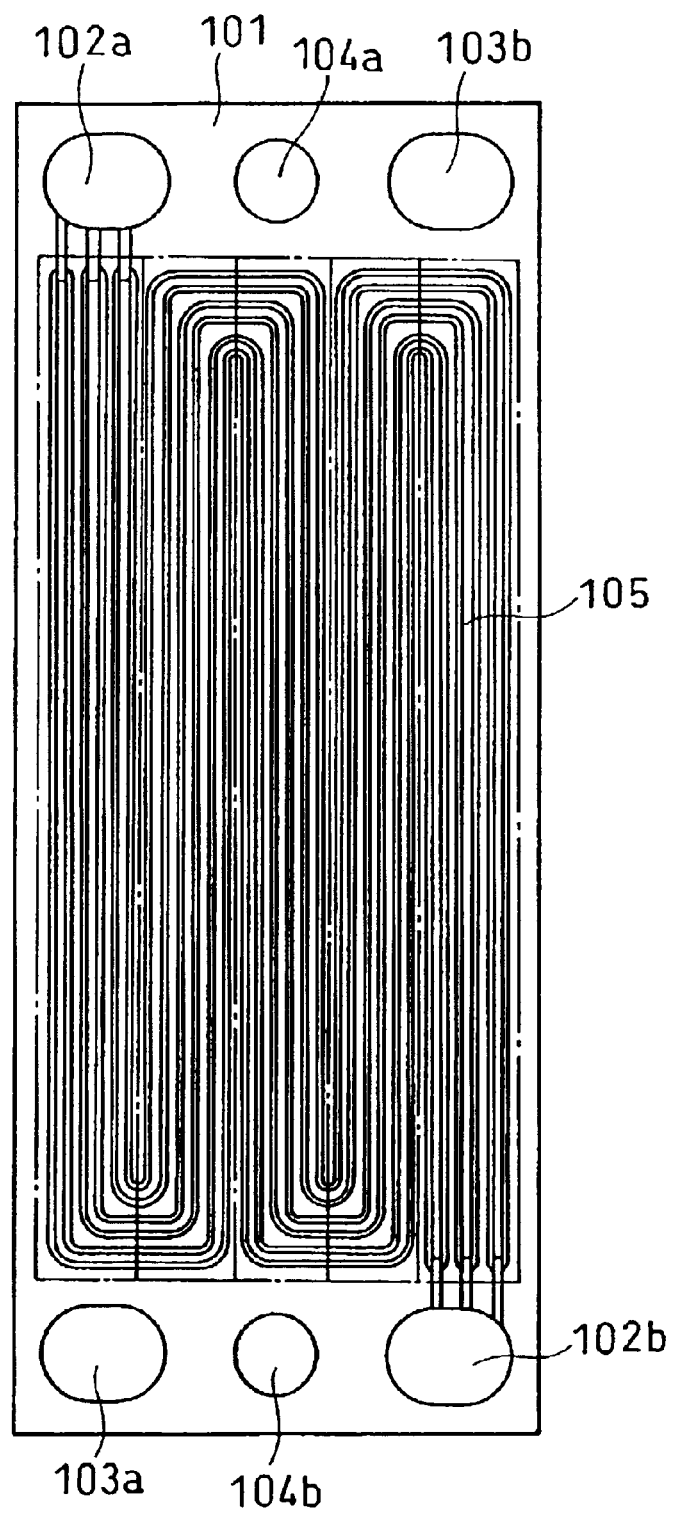
FIG. 10 is a front view of a cathode-side conductive separator plate in still another example.

FIG. 10 illustrates a cathode-side conductive separator plate used in this example.

A cathode-side separator plate 101 has an oxidant gas inlet manifold 102a, a fuel gas outlet manifold 103b, and a cooling water inlet manifold 104a along one shorter side and has an oxidant gas outlet manifold 102b, a fuel gas inlet manifold 103a, and a cooling water outlet manifold 104b along the other shorter side. Oxidant gas flow channels 105 are composed of three parallel grooves, and five linear parts are connected by four turns. Similarly, gas channels on the anode-side are composed of three parallel grooves, and five linear parts are connected by four turns. Cooling water flow channels also have a similar serpentine structure.

An MEA was produced as follows:

First, a carbon fine powder (VXC72, manufactured by Cabot Corporation in the U.S.A. having a primary particle size of 30 nm and a specific surface area of 254 m²/g) was caused to carry platinum particles having an average particle size of about 30 Å in a weight ratio of 75:25. A dispersion of this catalyst powder in isopropanol was mixed with a dispersion of perfluorocarbon sulfonic acid powder in ethyl alcohol to prepare a catalyst paste.

As a porous electrode base material, a carbon paper having a thickness of 360 µm (TGP-H-120, manufactured by Toray Industries, Inc.) was used. This carbon paper was impregnated with an aqueous dispersion of polytetrafluoroethylene (Neoflon ND1, manufactured by Daikin Industries, Ltd.), dried and subjected to heating treatment at 400° C. for 30 minutes to make it water repellent. The above-described catalyst paste was homogeneously applied to one face of the carbon paper subjected to the water repelling treatment to form a catalyst layer.

Two carbon paper electrodes produced in the above manner were laminated with a polymer electrolyte membrane (Nafion 112, produced by E.I. Du Pont de Nemours & Co. Inc. in the U.S.A.) interposed therebetween in such a manner that the catalyst layers of the two electrodes faced inward, followed by drying.

This carbon paper electrode was a rectangle having a size of 20×6 cm just large enough to cover five sections of the separator plate 101 surrounded by the dashed line as shown in FIG. 10. On the periphery of the electrodes, gaskets comprising a 360 µm thick silicon rubber sheet were arranged with the polymer electrolyte membrane therebetween, and the resultant assembly was hot pressed at 130° C. for 3 minutes, which gave an MEA.

Two MEAs thus produced were combined with a separator plate having oxidant gas flow channels on one side and fuel gas flow channels on the other side as shown in FIG. 10 in such a manner as to sandwich the separator plate. Also, two separator plates having a structure as shown in FIG. 10, each having cooling water flow channels on an opposing side and oxidant gas flow channels or fuel gas flow channels on the other side, were combined with each other. The combinations of the two MEAs and the combinations of the two separator plates were stacked to form a cell stack having a structure as shown in FIG. 1 comprising 10 cells connected in series.

The separator plate was produced by hot pressing a mixed powder of carbon powder and phenol resin into a 2 mm thick sheet having gas flow channels; the gas flow channels had a width of 2.5 mm and a depth of 0.7 mm, and the width of a rib between the grooves was 1.5 mm. This conductive separator plate had a bending strength of 70 MPa.

The cell stack was joined to a current collector plate made of metal, an insulating plate made of an electrically insulating material and an end plate at each end, and the end plates were clamped with clamping rods. The clamping pressure per area of the separator plate was 10 kgf/cm². To the cell module of 10 cells, pure hydrogen was supplied as the fuel gas through a deionized water bubbler maintained at 75° C., air was supplied as the oxidant gas through a deionized water bubbler maintained at a predetermined temperature, and cooling water was supplied, whereby a power generation test was conducted. The fuel gas, oxidant gas and cooling water were introduced in the same direction, and the gas outlet was open to the atmosphere.

In each cell of the fuel cell, the electrodes were divided into five portions as shown by the dashed line of the separator plate 101 of FIG. 10 and the separator plates were also divided into five in correspondence with the electrodes, such that the performance of each portion could be measured individually in order to check the performance distribution within the cell.

First, cell operating temperature was set at 75° C., a comparatively large amount of cooling water set at 75° C. was flown at 20 L/min in order to suppress temperature distribution as much as possible, and utilization rate of hydrogen in the fuel gas (Uf) and utilization rate of oxygen in the oxidant gas (Uo) were set to 80% and 50%, respectively, whereby the cell performance was examined.

The dependence of the voltage characteristics on the oxidant gas bubbler temperature was examined when the cell stack was operated at constant current densities of 0.3 A/cm² and 0.7 A/cm². Of the five divided cells, the divided cell closest to the gas inlet was referred to as No. 1, followed by No. 2, No. 3, and No. 4, and the divided cell closest to the gas outlet was referred to as No. 5.

In the operation at the current density of 0.3 A/cm$^2$, when the oxidant gas bubbler temperature was a relatively low temperature of about 45° C., the closer the portion was to the gas inlet, the higher the performance thereof became, and the average voltage of each divided cell in the cell stack of 10 cells was 0.69 V for No. 1 cell and 0.65 V for No. 5 cell (unless otherwise specified, the performance of the divided cell is hereinafter expressed as the average value of each divided cell in the cell stack of 10 cells). When the bubbler temperature was raised to about 70° C., the performance was further heightened to 0.75 V for No. 1 cell and 0.70 V for No. 5 cell. It was found at this time from the measurements of the internal resistance that No. 1 to 5 cells were humidified in an almost favorable manner. The pressure loss at the gas inlet was 0.01 kg·f/cm$^2$ when the oxidant gas bubbler temperature was 70° C.

Next, at the current density of 0.7 A/cm$^2$, when the oxidant gas bubbler temperature was a relatively low temperature of about 40° C., the performance was almost the same at the portion close to the gas inlet and the portion close to the gas outlet, and it was 0.6 V for No. 1 cell and 0.59 V for No. 5 cell. When the bubbler temperature was raised to 65° C., the performance was further heightened to 0.65 V for No. 1 cell and 0.60 V for No. 5 cell, wherein the closer the portion was to the gas inlet, the higher the performance became. At this time, it was found from the measurements of the internal resistance that No. 1 to 5 cells were humidified in an almost favorable manner although a little overflooding was observed at the outlet. The pressure loss at the gas inlet was as low as 0.08 kg·f/cm$^2$ when the oxidant gas bubbler temperature was 65° C.

Thereafter, cell operating temperature was set at 75° C., a comparatively small amount of cooling water set at 75° C. was flown at 1 L/min in order to cause temperature distribution, and the cell performance was examined at Uf=80% and Uo=50%.

At the current density of 0.3 A/cm$^2$, when the oxidant gas bubbler temperature was a relatively low temperature of about 40° C., the performance was almost the same at the portion close to the gas inlet and the portion close to the gas outlet, and it was 0.69 V for No. 1 cell and 0.68 V for No. 5 cell. When the bubbler temperature was raised to about 70° C., the performance was further heightened to 0.75 V for No. 1 cell and 0.73 V for No. 5 cell. At this time, it was found from the measurements of the internal resistance that No. 1 to 5 cells were humidified in an almost favorable manner. The pressure loss at the gas inlet was 0.008 kg·f/cm$^2$ when the oxidant gas bubbler temperature was 70° C.

At the current density of 0.7 A/cm$^2$, when the oxidant gas bubbler temperature was a relatively low temperature of about 45° C., the performance was almost the same at the portion close to the gas inlet and the portion close to the gas outlet, and it was 0.6 V for No. 1 cell and 0.6 V for No. 5 cell. When the bubbler temperature was raised to 65° C., the performance was further heightened to 0.65 V for No. 1 cell and 0.63 V for No. 5 cell. At this time, it was found from the measurements of the internal resistance that No. 1 to 5 cells were humidified in an optimal manner. The pressure loss at the gas inlet was as small as 0.07 kg·f/cm$^2$ when the oxidant gas bubbler temperature was 65° C.

In the above-described conductive separator plate, at least plural grooves constituting the gas flow channels or cooling water flow channels are across the central part of the separator plate, and the position of the center line of a convex between the grooves on one side of the separator plate is in substantial agreement with the position of the center line of a convex on the other side except for unavoidable portions. Therefore, it was possible to use even a conductive separator plate made of a material having a low mechanical strength such as a material having a bending strength of slightly lower than 100 MPa, without occurrence of cracking and buckling.

EXAMPLE 2

This example used a cathode-side conductive separator plate having linear gas flow channels as shown in FIG. 5 and an anode-side conductive separator plate having gas flow channels of the serpentine structure with four turns as shown in FIG. 3. Cooling water flow channels had the serpentine structure with four turns as shown in FIG. 4. The electrode was a rectangle having a size of 35×9 cm, and in each cell, the portion as shown by the dashed line of FIG. 5 was divided into five in the direction of gas flow in the gas flow channels 35.

Except for the above differences, a cell stack of 10 cells was assembled in the same manner as in Example 1.

First, cell operating temperature was set at 75° C., cooling water set at 75° C. was flown at 20 L/min, and the cell performance was examined at Uf=80% and Uo=50%.

At the current density of 0.3 A/cm$^2$, when the oxidant gas bubbler temperature was a relatively low temperature of about 45° C., the closer the portion was to the gas inlet, the higher the performance became, and it was 0.67 V for No. 1 cell and 0.65 V for No. 5 cell. When the bubbler temperature was raised to 70° C., the performance was further heightened to 0.73 V for No. 1 cell and 0.70 V for No. 5 cell. At this time, it was found from the measurements of the internal resistance that No. 1 to 5 cells were humidified in an almost favorable manner. The pressure loss at the gas inlet was 0.001 kg·f/cm$^2$ when the oxidant gas bubbler temperature was 70° C.

At the current density of 0.7 A/cm$^2$, when the oxidant gas bubbler temperature was a relatively low temperature of about 40° C., the performance was almost the same at the portion close to the gas inlet and the portion close to the gas outlet, and it was 0.59 V for No. 1 cell and 0.57 V for No. 5 cell. When the bubbler temperature was raised to 65° C., the performance was further heightened. The closer the portion was to the gas inlet, the higher the performance became, and it was 0.62 V for No. 1 cell and 0.59 V for No. 5 cell. At this time, it was found from the measurements of the internal resistance that No. 1 to 5 cells were humidified in an almost favorable manner although a little flooding was observed at the outlet. The pressure loss at the gas inlet was as small as 0.007 kg·f/cm$^2$ when the oxidant gas bubbler temperature was 65° C.

Next, the cell performance was examined under the same conditions as those of the above except that a relatively small amount of cooling water set at 75° C. was flown at 1 L/min.

At the current density of 0.3 A/cm$^2$, when the oxidant gas bubbler temperature was a relatively low temperature of about 45° C., the performance was almost the same at the portion close to the gas inlet and the portion close to the gas outlet, and it was 0.68 V for both No. 1 cell and No. 5 cell. When the bubbler temperature was raised to about 70° C., the performance was further heightened to 0.70 V for No. 1 cell and 0.69 V for No. 5 cell. At this time, it was found from the measurements of the internal resistance that No. 1 to 5 cells were humidified in an almost favorable manner. The pressure loss at the gas inlet was 0.001 kg·f/cm$^2$ when the oxidant gas bubbler temperature was 70° C.

At the current density of 0.7 A/cm$^2$, when the oxidant gas bubbler temperature was a relatively low temperature of about 45° C., the performance was almost the same at the portion close to the gas inlet and the portion close to the gas outlet, and it was 0.59 V for No. 1 cell and 0.58 V for No. 5 cell. When the bubbler temperature was raised to 65° C., the performance was further heightened to 0.62 V for No. 1 cell and 0.60 V for No. 5 cell. At this time, it was found from the measurements of the internal resistance that No. 1 to 5 cells were humidified in an optimal manner. The pressure loss at the gas inlet was as small as 0.005 kg·f/cm$^2$ when the oxidant gas bubbler temperature was 65° C.

EXAMPLE 3

This example used a cathode-side separator plate having linear gas flow channels as shown in FIG. 5 and an anode-side conductive separator plate having gas flow channels of the serpentine structure composed of linear parts extending along the shorter sides and 12 turns as shown in FIG. 6. Grooves constituting the gas flow channels had a depth of 0.4 mm. Cooling water flow channels had the serpentine structure with six turns as shown in FIG. 6. The electrode was a rectangle having a size of 20×9 cm, and each cell was divided into five in correspondence with the fuel gas flow channels in the same manner as in Example 1.

Except for the above differences, a cell stack of 10 cells was assembled in the same manner as in Example 1.

First, cell operating temperature was set at 75° C., a comparatively large amount of cooling water set at 75° C. was flown at 20 L/min, and the cell performance was examined at Uf=80% and Uo=50%.

At the current density of 0.3 A/cm$^2$, when the oxidant gas bubbler temperature was a relatively low temperature of about 45° C., the closer the portion was to the gas inlet, the higher the performance became, and it was 0.69 V for No. 1 cell and 0.67 V for No. 5 cell. When the bubbler temperature was raised to about 70° C., the performance was further heightened to 0.74 V for No. 1 cell and 0.71 V for No. 5 cell. At this time, it was found from the measurements of the internal resistance that No. 1 to 5 cells were humidified in an almost favorable manner. The pressure loss at the gas inlet was 0.0008 kg·F/cm$^2$ when the oxidant gas bubbler temperature was 70° C.

At the current density of 0.7 A/cm$^2$, when the oxidant gas bubbler temperature was a relatively low temperature of about 40° C., the performance was almost the same at the portion close to the gas inlet and the portion close to the gas outlet, and it was 0.60 V for No. 1 cell and 0.57 V for No. 5 cell. When the bubbler temperature was raised to 65° C., the performance was further heightened. The closer the portion was to the gas inlet, the higher the performance became, and it was 0.64 V for No. 1 cell and 0.60 V for No. 5 cell. At this time, it was found from the measurements of the internal resistance that No. 1 to 5 cells were humidified in an almost favorable manner although a little flooding was observed at the outlet. The pressure loss at the gas inlet was as small as 0.003 kg·f/cm$^2$ when the oxidant gas bubbler temperature was 65° C.

Next, the cell performance was examined under the same conditions as those of the above except that a relatively small amount of cooling water set at 75° C. was flown at 1 L/min.

At the current density of 0.3 A/cm$^2$, when the oxidant gas bubbler temperature was a relatively low temperature of about 45° C., the performance was almost the same at the portion close to the gas inlet and the portion close to the gas outlet, and it was 0.70 V for No. 1 cell and 0.69 V for No. 5 cell. When the bubbler temperature was raised to about 70° C., the performance was further heightened to 0.73 V for No. 1 cell and 0.71 V for No. 5 cell. At this time, it was found from the measurements of the internal resistance that No. 1 to 5 cells were humidified in an almost favorable manner. The pressure loss at the gas inlet was 0.0009 kg·f/cm$^2$ when the oxidant gas bubbler temperature was 70° C.

At the current density of 0.7 A/cm$^2$, when the oxidant gas bubbler temperature was a relatively low temperature of about 40° C., the performance was almost the same at the portion close to the gas inlet and the portion close to the gas outlet, and it was 0.61 V for No. 1 cell and 0.59 V for No. 5 cell. When the bubbler temperature was raised to 65° C., the performance was further heightened to 0.64 V for No. 1 cell and 0.62 V for No. 5 cell. At this time, it was found from the measurements of the internal resistance that No. 1 to 5 cells were humidified in an optimal manner. The pressure loss at the gas inlet was as small as 0.004 kg·f/cm$^2$ when the oxidant gas bubbler temperature was 65° C.

EXAMPLE 4

This example used a cathode-side conductive separator plate as shown in FIG. 7. The oxidant gas flow channels 75 are composed of plural, linear grooves extending continuously from the inlet manifold 72a to the outlet manifold 72b, and the shape of the flow channels tapers down from the inlet to the outlet. The portion in contact with the electrode is a trapezoid wherein the shorter side is 7 cm, the longer side 9 cm, and the height 20 cm.

The separator plate has a thickness of 3 mm and has gas flow channels formed on the surface by cutting; at the gas inlet, grooves have a width of 2 mm and a depth of 0.5 mm, and a rib formed between the grooves has a width of 1 mm, and at the gas outlet, the grooves have a width of 1.6 mm and a depth of 0.5 mm, and a rib formed between the grooves has a width of 0.8 mm$^{-1}$. As the material of the separator plate, a dense glassy carbon was used.

A separator plate having gas flow channels of the serpentine structure with 12 turns as in Example 3 was used as the anode-side conductive separator plate. Cooling water flow channels are of the serpentine structure with six turns.

Except for the above differences, a cell stack of 100 cells was assembled in the same manner as in Example 1.

First, cell operating temperature was set at 75° C., a comparatively large amount of cooling water set at 75° C. was flown at 20 L/min, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm$^2$, the average cell voltage of the cell stack of 100 cells was 0.72 V, and the pressure loss at the gas inlet of the air was as small as 0.0014 kg·f/cm$^2$. At the current density of 0.7 A/cm$^2$, the average cell voltage was 0.64 V, and the pressure loss at the gas inlet of the air was 0.006 kg·f/cm$^2$.

Next, a comparatively small amount of cooling water set at 75° C. was flown at 1 L/min, a pure hydrogen gas humidified at 75° C. was supplied so as to achieve Uf=80%, and air humidified at 45° C. was supplied so as to achieve Uo=50%, whereby the cell performance was examined.

At the current density of 0.3 A/cm$^2$, the average cell voltage of the cell was 0.70 V, and the pressure loss at the gas inlet of the air was as small as 0.0011 kg·f/cm². At the current density of 0.7 A/cm², the average cell voltage was 0.61 V, and the pressure loss at the gas inlet of the air was as small as 0.005 kg·f/cm².

EXAMPLE 5

This example used a cathode-side conductive separator plate as shown in FIG. 8. In the conductive separator plate, the portion in contact with the electrode is a substantial rectangle wherein the shorter side is 9 cm and the longer side is 20 cm. Grooves constituting the oxidant gas flow channels 85 extend almost continuously along the longer sides from the inlet manifold 82*a* to the outlet manifold 82*b*.

The separator plate has a thickness of 3 mm and has gas flow channels formed on the surface by cutting; at the inlet, grooves have a width of 2 mm and a depth of 0.4 mm, and a rib formed between the grooves has a width of 1 mm, and at the outlet, the grooves have a width of 1.6 mm and a depth of 0.5 mm, and a rib formed between the grooves has a width of 0.8 mm. As the material of the separator plate, a dense glassy carbon was used.

A separator plate having gas flow channels of the serpentine structure with 12 turns as in Example 3 was used as the anode-side conductive separator plate. Cooling water flow channels are of the serpentine structure with six turns.

Except for the above differences, a cell stack of 100 cells was assembled in the same manner as in Example 1.

First, cell operating temperature was set at 75° C., a comparatively large amount of cooling water set at 75° C. was flown at 20 L/min, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm², the average cell voltage of the cell stack was 0.725 V, and the pressure loss at the gas inlet of the air was as small as 0.0012 kg·f/cm². At the current density of 0.7 A/cm², the average cell voltage was 0.645 V, and the pressure loss at the gas inlet of the air was 0.005 kg·f/cm².

Next, a comparatively small amount of cooling water set at 75° C. was flown at 1 L/min to cause temperature distribution between the inlet and the outlet of cooling water, a pure hydrogen gas humidified at 75° C. was supplied so as to achieve Uf=80%, and air humidified at 45° C. was supplied so as to achieve Uo=50%, whereby the cell performance was examined.

At the current density of 0.3 A/cm², the average cell voltage of the cell stack was 0.71 V, and the pressure loss at the gas inlet of the air was as small as 0.001 kg·f/Cm². At the current density of 0.7 A/cm², the average cell voltage was 0.62 V, and the pressure loss at the gas inlet of the air was 0.004 kg·f/cm².

EXAMPLE 6

This example used a cathode-side conductive separator plate as shown in FIG. 9. In the conductive separator plate, the gas flow channels 95 are composed of parallel grooves that have a break 95*c* halfway but are substantially linear. The electrode used is a substantial rectangle wherein the shorter side is 9 cm and the longer side is 20 cm, and four edges are rounded off at a curvature radius of r=1 mm.

The separator plate has a thickness of 3 mm and has gas flow channels formed on the surface by cutting; the grooves have a width of 1.5 mm and a depth of 1 mm, and a rib formed between the grooves has a width of 1 mm. As the material of the separator plate, a dense glassy carbon was used.

A separator plate having gas flow channels of the serpentine structure with 12 turns as in Example 3 was used as the anode-side conductive separator plate. Cooling water flow channels are of the serpentine structure with six turns.

Except for the above differences, a cell stack of 100 cells was assembled in the same manner as in Example 1.

First, cell operating temperature was set at 75° C., a comparatively large amount of cooling water set at 75° C. was flown at 20 L/min, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm², the average cell voltage of the cell stack was 0.715 V, and the pressure loss at the gas inlet of the air was as small as 0.0005 kg·f/cm². At the current density of 0.7 A/cm², the average cell voltage was 0.635 V, and the pressure loss at the gas inlet of the air was 0.002 kg·f/cm².

Next, a comparatively small amount of cooling water set at 75° C. was flown at 1 L/min to cause temperature distribution between the inlet and the outlet of cooling water, a pure hydrogen gas humidified at 75° C. was supplied so as to achieve Uf=80%, and air humidified at 45° C. was supplied so as to achieve Uo=50%, whereby the cell performance was examined.

At the current density of 0.3 A/cm², the average cell voltage of the cell stack was 0.705 V, and the pressure loss at the gas inlet of the air was as small as 0.0006 kg·f/cm². At the current density of 0.7 A/cm², the average cell voltage was 0.61 V, and the pressure loss at the gas inlet of the air was 0.0025 kg·f/cm².

As described above, in the case of using a conductive separator plate having a substantially rectangular part in contact with the electrode wherein the length of the longer side of the substantial rectangle is equal to or more than twice the length of the shorter side, the same effects can be obtained from the shape of the substantial rectangle even if the substantial rectangle is a trapezoid or parallelogram in the strict sense, has edges which are rounded off, has partial irregularities, etc.

Also, with regard to the shape of the grooves of the gas flow channels having a substantially linear part along the longer sides of the substantial rectangle, even if the shape is not completely linear, for example, bended, slightly inclined relative to the longer sides, or varied in groove width, the same effects can be obtained.

COMPARATIVE EXAMPLE 1

Figure 12:
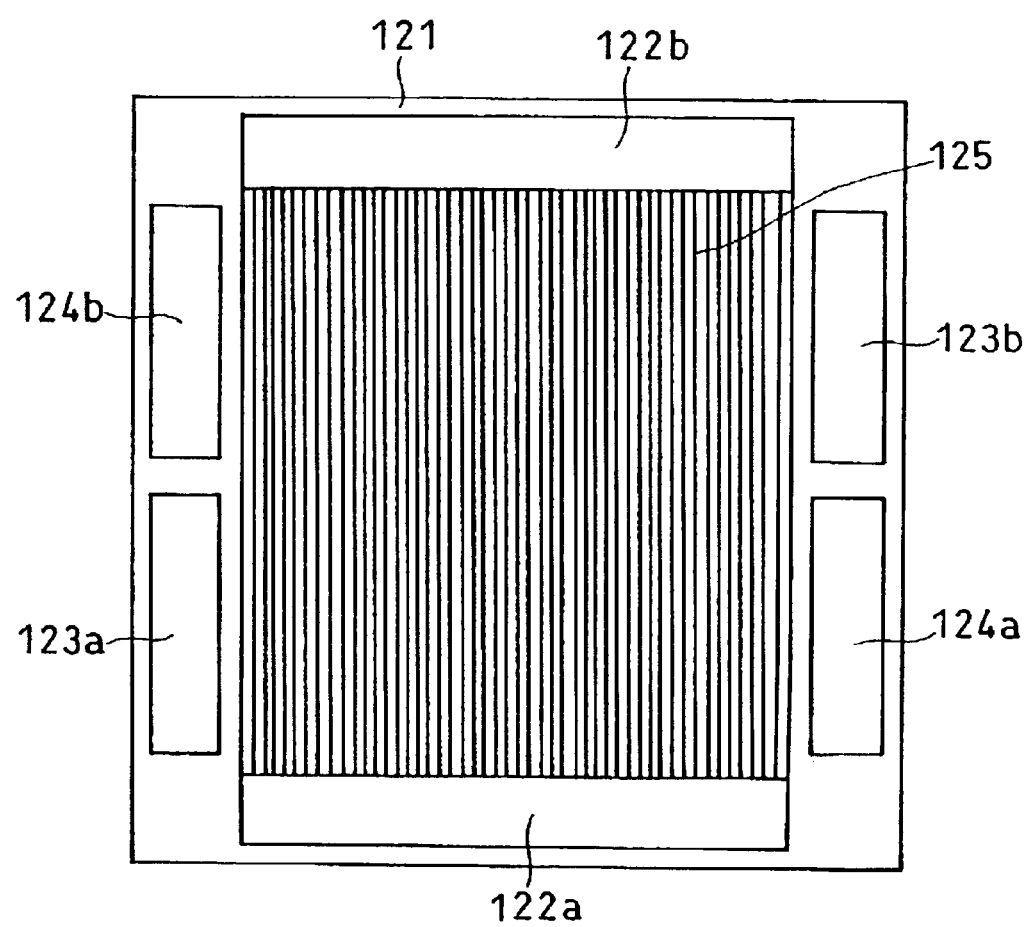
FIG. 12 is a front view of a cathode-side conductive separator plate in a comparative example.

This example used a cathode-side conductive separator plate as shown in FIG. 12. The separator plate 121 is a substantial square, wherein an oxidant gas inlet manifold 122*a* and an oxidant gas outlet manifold 122*b* are arranged along opposing two sides and a fuel gas inlet manifold 123*a*, a fuel gas outlet manifold 123*b*, a cooling water inlet manifold 124*a*, and a cooling water outlet manifold 124*b* are arranged along the other two sides. Oxidant gas flow channels 125 are composed of linear, parallel grooves. Fuel gas flow channels and cooling water flow channels are of the serpentine structure, and the number of turns is two in both flow channels.

The separator plate has a thickness of 3 mm and has gas flow channels 125 formed on the surface by cutting; the grooves have a width of 2 mm and a depth of 0.5 mm, and a rib formed between the grooves has a width of 1 mm. As the material of the separator plate, a dense glassy carbon was used.

The electrode is a square whose side is 15 cm, and the electrode was disposed in the center of a polymer electrolyte membrane of a square whose side is 21 cm.

Except for the above differences, a cell stack of 100 cells was assembled in the same manner as in Example 1.

First, cell operating temperature was set at 75° C., a comparatively large amount of cooling water set at 75° C. was flown at 20 L/min in order to suppress temperature distribution as much as possible, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm$^2$, the average cell voltage of the cell stack was 0.48 V. At the current density of 0.7 A/cm$^2$ or higher, some cells ended up in 0 V or less due to overflooding, making the measurements of the performance impossible.

COMPARATIVE EXAMPLE 2

Figure 13:
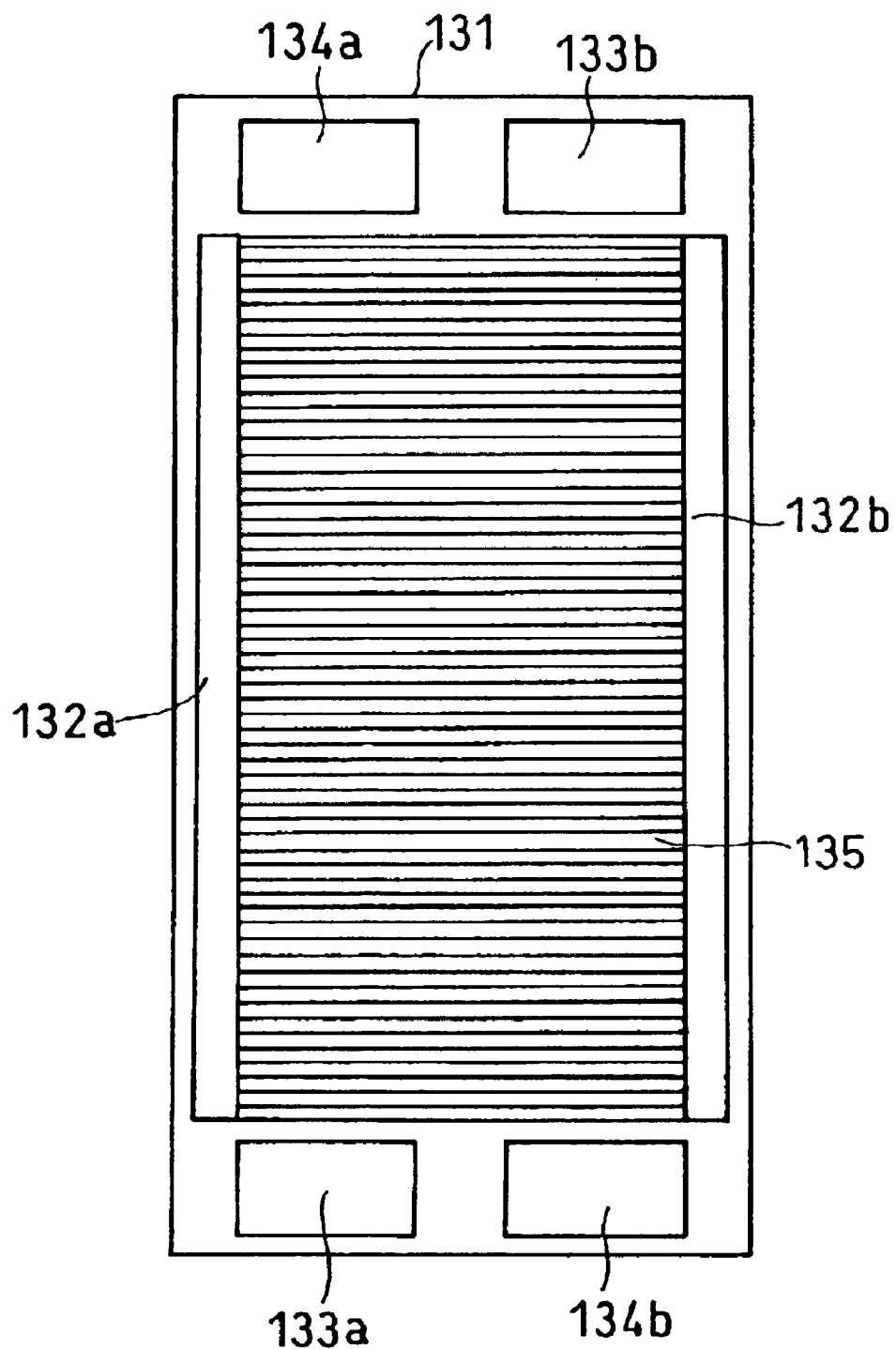
FIG. 13 is a front view of a cathode-side conductive separator plate in another comparative example.

This example used a cathode-side conductive separator plate as shown in FIG. 13. The separator plate 131 is a rectangle, wherein an oxidant gas inlet manifold 132a and an oxidant gas outlet manifold 132b are arranged along opposing longer sides and a fuel gas inlet manifold 133a, a fuel gas outlet manifold 133b, a cooling water inlet manifold 134a, and a cooling water outlet manifold 134b are arranged along the shorter sides. Oxidant gas flow channels 135 are composed of linear, parallel grooves. Fuel gas flow channels and cooling water flow channels are of the serpentine structure, and the number of turns is two in both flow channels.

The separator plate has a thickness of 3 mm and has gas flow channels formed on the surface by cutting; the grooves have a width of 2 mm and a depth of 0.5 mm, and a rib formed between the grooves has a width of 1 mm. The electrode is a rectangle of 9×20 cm.

Except for the above differences, a cell stack of 100 cells was assembled in the same manner as in Example 1.

First, cell operating temperature was set at 75° C., a comparatively large amount of cooling water set at 75° C. was flown at 20 L/min, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm$^2$, the average cell voltage of the cell stack was 0.42 V. At the current density of 0.7 A/cm$^2$ or higher, some cells ended up in 0 V or less due to overflooding, making the measurements of the performance impossible.

COMPARATIVE EXAMPLE 3

Figure 14:
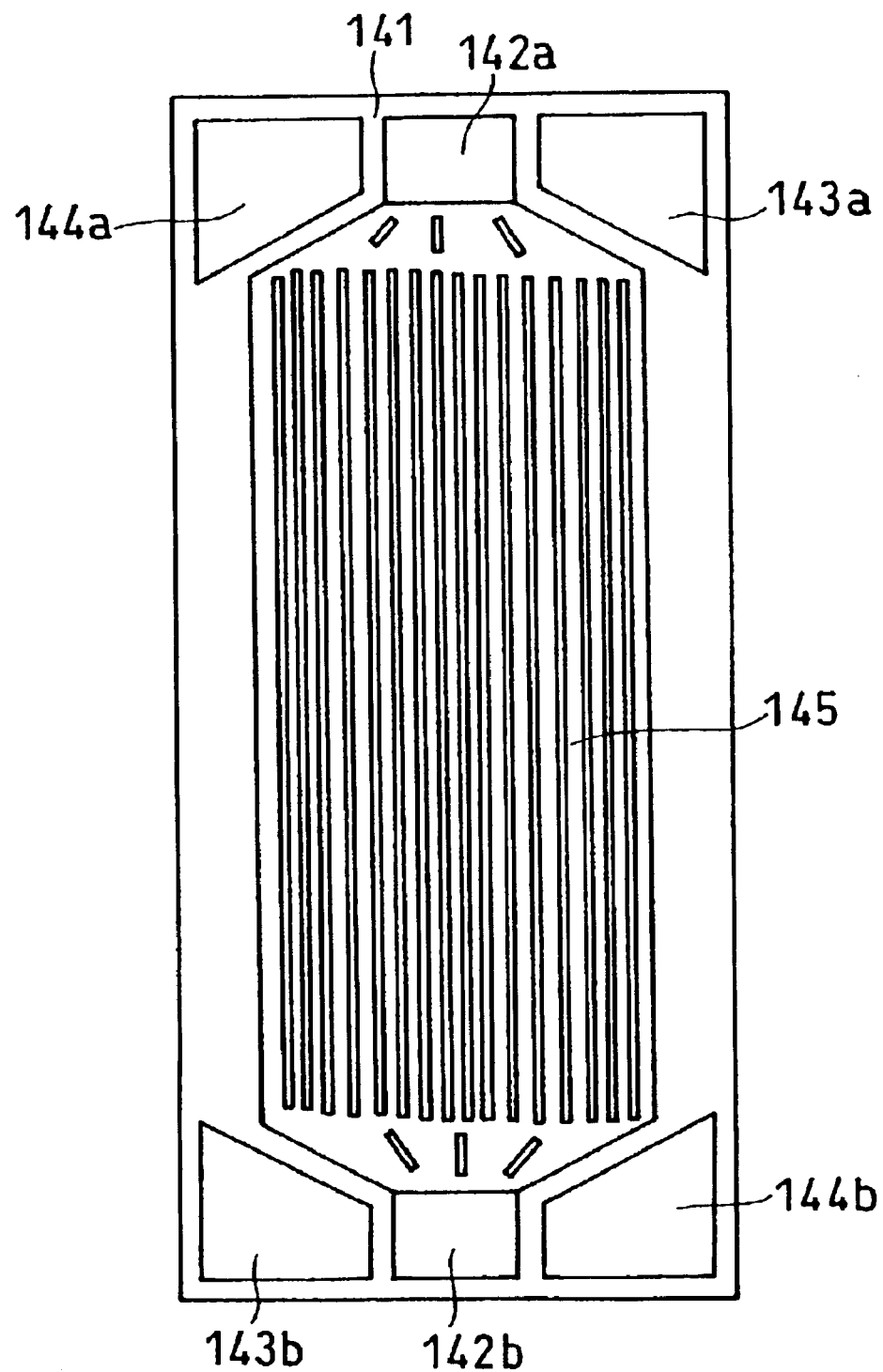
FIG. 14 is a front view of a cathode-side conductive separator plate in still another comparative example.

This example used a cathode-side conductive separator plate as shown in FIG. 14. The separator plate 141 is a rectangle. An oxidant gas inlet manifold 142a, a fuel gas inlet manifold 143a, and a cooling water inlet manifold 144a are arranged along one shorter side of the rectangle and an oxidant gas outlet manifold 142b, a fuel gas outlet manifold 143b, and a cooling water outlet manifold 144b are arranged along the other shorter side.

Oxidant gas flow channels 145 are composed of linear, parallel grooves. The width of the opening of each of the gas manifolds 142a and 142b was designed to be less than the sum of the widths of the grooves of the gas flow channels communicating with these manifolds. Fuel gas flow channels and cooling water flow channels are of the serpentine structure, and the number of turns is two in both flow channels.

Except for the above differences, a cell stack of 100 cells was assembled in the same manner as in Comparative Example 2.

First, cell operating temperature was set at 75° C., a comparatively large amount of cooling water set at 75° C. was flown at 20 L/min, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm$^2$, the average cell voltage of the cell stack was 0.40 V. At the current density of 0.7 A/cm$^2$ or higher, some cells ended up in 0 V or less, since the opening of the air outlet manifold was less than the total width of the air flow channels and therefore removal of generated water could not be done smoothly, making the measurements of the performance impossible.

Also, in the stack of 100 cells, when the sum of the cross sectional areas of the gas flow grooves of the separator plates was compared with the cross sectional area of the opening of the manifold, the sum of the cross sectional areas of the gas flow grooves of the separator plates in the 100 cells was larger, so that the loss of gas supply pressure at the manifold became the rate-determining factor to hamper uniform distribution of the gas supplied to each cell, thereby resulting in large variation in cell performance.

COMPARATIVE EXAMPLE 4

This example used a conductive separator plate having linear oxidant gas flow channels as shown in FIG. 5 and fuel gas flow channels of the serpentine structure with four turns as shown in FIG. 10.

The separator plate has a thickness of 3 mm and has gas flow channels formed on the surface by cutting; grooves have a width of 2 mm and a depth of 0.5 mm, and a rib formed between the grooves has a width of 1 mm. The electrode is a rectangle of 60×9 cm.

Except for the above differences, a cell stack of 100 cells was assembled in the same manner as in Comparative Example 2.

First, cell operating temperature was set at 75° C., a comparatively large amount of cooling water set at 75° C. was flown at 20 L/min, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm$^2$, the average cell voltage of the cell stack was 0.72 V. At the current density of 0.7 A/cm$^2$, it was 0.62 V, exhibiting relatively favorable performance. However, the loss of air supply pressure was 0.2 kg·f/cm$^2$ at the current density of 0.3 A/cm$^2$ and 0.8 kg·f/cm$^2$ at the current density of 0.7 A/cm$^2$, so that the use of a blower for supplying air was impossible. Thus, a compressor was used to supply air. Also, the loss of cooling water supply pressure became extremely large.

Next, cell operating temperature was set at 75° C., a comparatively large amount of cooling water set at 75° C. was flown at 1 L/min, a pure hydrogen gas humidified at 75° C. was supplied so as to achieve Uf=80%, and air humidified at 65° C. was supplied so as to achieve Uo=50%, whereby the cell performance was examined.

At the current density of 0.3 A/cm$^2$, the average cell voltage of the cell stack was 0.65 V. At the current density of 0.7 A/cm$^2$, it was 0.55 V, exhibiting low performance, since a reduced amount of cooling water was flown. The reduction of cooling water caused excessive temperature distribution between the inlet and the outlet of cooling water, making the inside of the cell overdried. The loss of air supply pressure was 0.18 kg·f/cm$^2$ at the current density of 0.3 A/cm$^2$ and 0.7 kg·f/cm$^2$ at the current density of 0.7 A/cm$^2$, so that the use of a blower for supplying air was impossible. Thus, a compressor was used to supply air.

COMPARATIVE EXAMPLE 5

Figure 11:
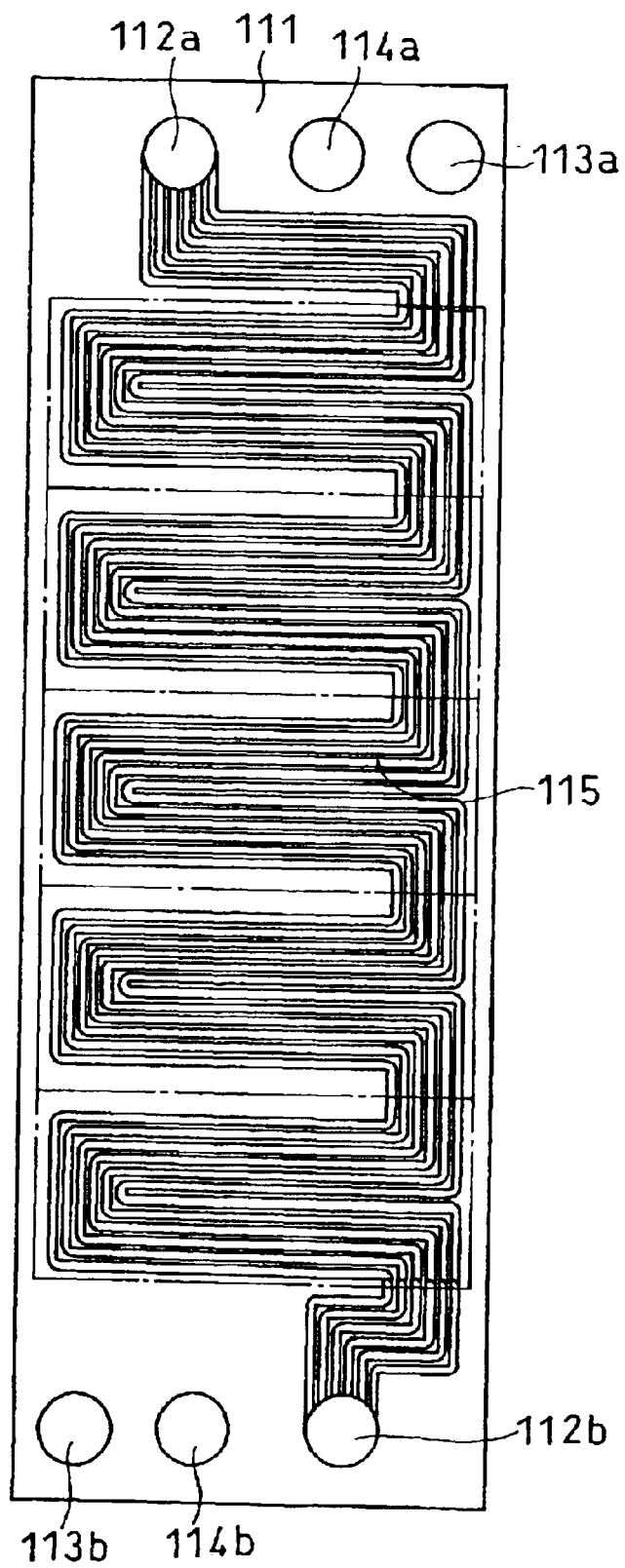
FIG. 11 is a front view of a conductive separator plate in a comparative example.

This example used a cathode-side conductive separator plate as shown in FIG. 11. The conductive separator plate 111 is a rectangle, wherein an oxidant gas inlet manifold 112a, a fuel gas inlet manifold 113a, and a cooling water inlet manifold 114a are arranged along one shorter side and an oxidant gas outlet manifold 112b, a fuel gas outlet manifold 113b, and a cooling water outlet manifold 114b are arranged along the other shorter side. Oxidant gas flow channels 115 are composed of five parallel grooves and are of the serpentine structure in which 10 linear parts are connected by nine turns. Similarly, gas flow channels on an anode-side are composed of five parallel grooves, and 10 linear parts are connected by nine turns. Cooling water flow channels are also of the serpentine structure.

The electrode is a rectangle having a size of 9×20 cm, and each cell was divided into five as shown by the dashed line in FIG. 11.

The separator plate used in this example has a thickness of 3 mm and has gas flow channels formed on the surface by cutting; the grooves have a width of 2 mm and a depth of 1 mm, and a rib formed between the grooves has a width of 1 mm. As the material of the separator plate, a dense glassy carbon was used.

Except for the above differences, a cell stack of 10 cells was assembled in the same manner as in Example 1.

First, cell operating temperature was set at 75° C., a comparatively large amount of cooling water set at 75° C. was flown at 20 L/min, the cell performance was examined at Uf=80% and Uo=50%.

In the operation of the cell stack at the current density of 0.3 A/cm$^2$, when the oxidant gas bubbler temperature was a relatively low temperature of about 60° C., the closer the portion was to the gas inlet, the higher the performance thereof became; No. 1 cell, closest to the gas inlet, exhibited 0.69 V and No. 5 cell, closest to the gas outlet, exhibited 0.55 V. When the bubbler temperature was raised to about 70° C., however, the performance was sharply lowered sequentially from No. 5 cell, which was the closest to the gas outlet, and No. 5 cell exhibited as low as about 0 V. At this time, it was found from the measurements of the internal resistance that No. 5 cell was overflooding. The pressure loss at the gas inlet was 0.5 kg·f/cm$^2$ when the oxidant gas bubbler temperature was 70° C.

At the current density of 0.7 A/cm$^2$, when the oxidant gas bubbler temperature was a relatively low temperature of about 55° C., the closer the portion was to the gas inlet, the higher the performance thereof became, and No. 1 cell exhibited 0.6 V and No. 5 cell exhibited 0.5 V. When the bubbler temperature was raised to 65° C., however, the performance of No. 5 cell, which was the closest to the gas outlet, was sharply lowered to as low as about 0 V. At this time, it was found from the measurements of the internal resistance that No. 5 cell was overflooding. The pressure loss at the gas inlet was as high as 1.5 kg·f/cm$^2$ when the oxidant gas bubbler temperature was 65° C.

INDUSTRIAL APPLICABILITY

According to the present invention, it is possible to make a polymer electrolyte fuel cell stack thinner and more compact. Also, it is possible to provide a polymer electrolyte fuel cell that suffers less pressure loss in supplying a fuel gas and an oxidant gas and causes no overflooding and overdry. Further, it is possible to provide a thin fuel cell that is suitably installed particularly in a lower part of the body of an electric vehicle as a power source.

What is claimed is:

1. A polymer electrolyte fuel cell comprising a hydrogen-ion conductive polymer electrolyte membrane, an anode and a cathode sandwiching said hydrogen-ion conductive polymer electrolyte membrane, an anode-side conductive separator plate having gas flow channels for supplying a fuel gas to said anode, and a cathode-side conductive separator plate having gas flow channels for supplying an oxidant gas to said cathode, wherein said anode-side and cathode-side conductive separator plates have a substantially rectangular part in contact with the anode or cathode in which the length of a longer side is not less than twice and not more than six times the length of a shorter side, an oxidant gas inlet manifold is formed in the vicinity of one of the shorter sides of said rectangular part and an oxidant gas outlet manifold is formed in the vicinity of the other of the shorter sides, each of said manifolds being formed as a through-hole of the separator plate, the oxidant gas flow channels of said cathode-side conductive separator plate have a linear part formed along said longer side, and each of said inlet manifold and outlet manifold has an opening having a width which is at least approximately equal to the sum of the widths of said gas flow channels communicating with said manifold, wherein said cathode-side conductive separator plate has, on the backside, cooling water flow channels having a linear part along the longer side of said rectangular part, and the flow direction of the oxidant gas in the linear part of said gas flow channels is substantially the same as the flow direction of the cooling water in the linear part of said cooling water flow channels.

2. The polymer electrolyte fuel cell in accordance with claim 1, wherein said cathode-side conductive separator plate has a plurality of oxidant gas flow channels which are substantially linear and continuous along the longer side from one of the shorter sides toward the other of the shorter sides.

3. The polymer electrolyte fuel cell in accordance with claim 1, wherein said oxidant gas flow channels have a serpentine structure composed of a plurality of linear, parallel gas flow channels along the longer side of said cathode-side conductive separator plate and at least one turn where the gas flow channels make a turn, and said turn is located in the vicinity of one of the shorter sides of said cathode-side conductive separator plate.

4. The polymer electrolyte fuel cell in accordance with claim 3, wherein said fuel gas flow channels have a serpentine structure composed of a plurality of linear, parallel gas flow channels along the longer side of said anode-side conductive separator plate and at least one turn where the gas flow channels make a turn, and said turn is located in the vicinity of one of the shorter sides of said anode-side conductive separator plate.

5. The polymer electrolyte fuel cell in accordance with claim 4, wherein said oxidant gas flow channels have two turns, and said fuel gas flow channels have two or four turns.

6. The polymer electrolyte fuel cell in accordance with claim 3, wherein grooves constituting said gas flow channels or cooling water flow channels run across a central part on respective sides of the separator plate, and the position of the center line of a rib between the grooves on one side of said separator plate is in substantial alignment with the position of the center line of a rib between the grooves on the other side except at portions of the ribs which are unavoidably different due to different positions of the grooves in the vicinity of the respective manifolds.

7. A polymer electrolyte fuel cell comprising a hydrogen-ion conductive polymer electrolyte membrane, an anode and a cathode sandwiching said hydrogen-ion conductive polymer electrolyte membrane, an anode-side conductive separator plate having gas flow channels for supplying a fuel gas to said anode, and a cathode-side conductive separator plate having gas flow channels for supplying an oxidant gas to said cathode, wherein said anode-side and cathode-side conductive separator plates have a substantially rectangular part in contact with the anode or cathode in which the length of a longer side is not less than twice and not more than six times the length of a shorter side, an oxidant gas inlet manifold is formed in the vicinity of one of the shorter sides of said rectangular part and an oxidant gas outlet manifold is formed in the vicinity of the other of the shorter sides, each of said manifolds being formed as a through-hole of the separator plate, the oxidant gas flow channels of said cathode-side conductive separator plate has a linear part formed along said longer side, and each of said inlet manifold and outlet manifold has an opening having a width which is at least approximately equal to the sum of the widths of said gas flow channels communicating with said manifold, wherein in the anode-side and cathode-side conductive separator plates, grooves constituting the fuel gas and oxidant gas flow channels have a width of 1.5 to 2.5 mm and a depth of 0.4 to 1 mm, and a rib between the grooves has a width of 0.5 to 1.5 mm.

8. The polymer electrolyte fuel cell in accordance with claim 7, wherein said oxidant gas flow channels have a serpentine structure composed of a plurality of linear, parallel gas flow channels along the longer side of said cathode-side conductive separator plate and at least one turn where the gas flow channels make a turn, and said turn is located in the vicinity of one of the shorter sides of said cathode-side conductive separator plate.

9. The polymer electrolyte fuel cell in accordance with claim 8, wherein said fuel gas flow channels have a serpentine structure composed of a plurality of linear, parallel gas flow channels along the longer side of said anode-side conductive separator plate and at least one turn where the gas flow channels make a turn, and said turn is located in the vicinity of one of the shorter sides of said anode-side conductive separator plate.

10. The polymer electrolyte fuel cell in accordance with claim 9, wherein said oxidant gas flow channels have two turns, and said fuel gas flow channels have two or four turns.

11. The polymer electrolyte fuel cell in accordance with claim 7, wherein said cathode-side conductive separator plate has, on the backside, cooling water flow channels having a linear part along the longer side of said rectangular part, and the flow direction of the oxidant gas in the linear part of said gas flow channels is substantially the same as the flow direction of the cooling water in the linear part of said cooling water flow channels.

12. The polymer electrolyte fuel cell in accordance with claim 11, wherein grooves constituting said gas flow channels or cooling water flow channels run across a central part on respective sides of the separator plate, and the position of the center line of a rib between the grooves on one side of said separator plate is in substantial alignment with the position of the center line of a rib between the grooves on the other side except at portions of the ribs which are unavoidably different due to different positions of the grooves in the vicinity of the respective manifolds.

13. The polymer electrolyte fuel cell in accordance with claim 7, wherein said cathode-side conductive separator plate has a plurality of oxidant gas flow channels which are substantially linear and continuous along the longer side from one of the shorter sides toward the other of the shorter sides.

* * * * *